(12) United States Patent
Osaki et al.

(10) Patent No.: US 12,398,780 B2
(45) Date of Patent: Aug. 26, 2025

(54) TOOTHED BELT AND MANUFACTURING METHOD THEREFOR

(71) Applicant: Mitsuboshi Belting Ltd., Kobe (JP)

(72) Inventors: Susumu Osaki, Hyogo (JP); Yusuke Hemmi, Hyogo (JP); Takumi Mizumoto, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/697,154

(22) PCT Filed: Sep. 27, 2022

(86) PCT No.: PCT/JP2022/036042
§ 371 (c)(1),
(2) Date: Mar. 29, 2024

(87) PCT Pub. No.: WO2023/054413
PCT Pub. Date: Apr. 6, 2023

(65) Prior Publication Data
US 2024/0401668 A1    Dec. 5, 2024

(30) Foreign Application Priority Data

Sep. 29, 2021 (JP) .................................. 2021-159743
May 26, 2022 (JP) .................................. 2022-086291
Sep. 9, 2022 (JP) .................................. 2022-143790

(51) Int. Cl.
*F16G 1/28*    (2006.01)
*B32B 3/08*    (2006.01)
(Continued)

(52) U.S. Cl.
CPC .................. *F16G 1/28* (2013.01); *B32B 3/08* (2013.01); *B32B 3/28* (2013.01); *B32B 5/024* (2013.01);
(Continued)

(58) Field of Classification Search
CPC ...... F16G 1/28; F16G 1/10; B32B 2262/0253; B32B 2262/0261; B32B 2262/0276;
(Continued)

(56) References Cited

U.S. PATENT DOCUMENTS 4,775,357 A * 10/1988 Wolfe ..................... F16G 1/28
474/263
5,259,822 A * 11/1993 Nakanishi ............... F16G 1/28
474/263
(Continued)

FOREIGN PATENT DOCUMENTS

CN    110285191 A    9/2019
JP    2008-115933 A    5/2008
(Continued)

OTHER PUBLICATIONS

Dec. 13, 2022—International Search Report—Intl App PCT/JP2022/036042.
(Continued)

*Primary Examiner* — Henry Y Liu
(74) *Attorney, Agent, or Firm* — Banner & Witcoff, Ltd.

(57) ABSTRACT

The present invention relates to a toothed belt, including: a back portion including a tension member; a plurality of tooth portions; a back rubber layer; and a first rubber layer and a second rubber layer that are formed on a belt inner circumferential side with respect to the tension member, in which an elastic modulus of the first rubber layer is larger than that of the second rubber layer, the first rubber layer includes a first crosslinked rubber composition including a first rubber component and a first short fiber, a proportion of the first short fiber is 5 parts by mass to 60 parts by mass with respect to 100 parts by mass of the first rubber component, the first short fiber is oriented in a belt longitudinal direction along a contour of the tooth portion.

9 Claims, 6 Drawing Sheets

(51) Int. Cl.
  *B32B 3/28* (2006.01)
  *B32B 5/02* (2006.01)
  *B32B 7/022* (2019.01)
  *B32B 25/02* (2006.01)
  *B32B 25/04* (2006.01)
  *B32B 25/10* (2006.01)
  *B32B 25/14* (2006.01)

(52) U.S. Cl.
  CPC .............. *B32B 7/022* (2019.01); *B32B 25/02* (2013.01); *B32B 25/042* (2013.01); *B32B 25/10* (2013.01); *B32B 25/14* (2013.01); *B32B 2262/0253* (2013.01); *B32B 2262/0261* (2013.01); *B32B 2262/0276* (2013.01); *B32B 2262/0292* (2013.01); *B32B 2262/106* (2013.01); *B32B 2262/148* (2021.05); *B32B 2264/108* (2013.01); *B32B 2307/536* (2013.01); *B32B 2307/54* (2013.01); *B32B 2307/737* (2023.05); *B32B 2413/00* (2013.01); *B32B 2433/04* (2013.01)

(58) Field of Classification Search
  CPC ...... B32B 2262/0292; B32B 2262/106; B32B 2262/108; B32B 2262/148; B32B 3/08; B32B 3/28; B32B 5/024; B32B 7/022; B32B 25/02; B32B 25/042; B32B 25/10; B32B 25/14; B32B 2413/00; B32B 2433/04; B29D 29/08
  USPC ........................................................ 474/205
  See application file for complete search history.

(56) References Cited

U.S. PATENT DOCUMENTS

| | | | | |
|---|---|---|---|---|
| 5,268,221 A * | 12/1993 | Nakanishi | ............... | D02G 3/447 474/260 |
| 5,860,883 A * | 1/1999 | Jonen | ........................ | F16G 5/20 474/271 |
| 6,117,035 A * | 9/2000 | Isshiki | ....................... | F16G 1/28 474/260 |
| 6,406,397 B1 * | 6/2002 | Isshiki | ....................... | F16G 1/28 474/263 |
| 7,135,082 B2 * | 11/2006 | Hara | ...................... | B29D 29/08 156/138 |
| 8,002,922 B2 * | 8/2011 | Onita | ........................ | F16G 5/20 156/137 |
| 11,654,645 B2 * | 5/2023 | Tamura | ................... | B32B 5/026 474/205 |
| 2007/0191163 A1 * | 8/2007 | Kanzow | .................... | F16G 1/28 474/205 |
| 2007/0232429 A1 * | 10/2007 | Knox | ........................ | F16G 1/28 474/260 |
| 2007/0249451 A1 * | 10/2007 | Wu | .......................... | F16G 1/28 474/263 |
| 2008/0318719 A1 * | 12/2008 | Izu | ............................ | F16G 1/28 474/205 |
| 2010/0120566 A1 * | 5/2010 | Izu | ............................ | F16G 1/28 474/205 |
| 2010/0279808 A1 * | 11/2010 | Fan | .......................... | F16G 5/20 474/205 |
| 2011/0118068 A1 * | 5/2011 | Mitsutomi | ................ | F16G 1/10 474/205 |
| 2012/0252619 A1 * | 10/2012 | Uchigashima | ........... | F16G 1/10 474/205 |
| 2012/0309573 A1 * | 12/2012 | Well | .......................... | F16G 1/10 474/205 |
| 2013/0040771 A1 * | 2/2013 | Well | .......................... | F16G 1/28 474/205 |
| 2013/0190120 A1 * | 7/2013 | Fan | .......................... | F16G 5/06 474/205 |
| 2013/0337956 A1 * | 12/2013 | Motozaki | ............. | D03D 1/0094 474/205 |
| 2015/0369335 A1 * | 12/2015 | Ishiguro | .................. | C08L 23/16 474/260 |
| 2016/0040749 A1 * | 2/2016 | Kageyama | ................ | B32B 3/30 474/8 |
| 2019/0390047 A1 * | 12/2019 | Ozaki | ....................... | F16G 5/08 |
| 2023/0313861 A1 * | 10/2023 | Yoshimura | ............ | D06M 15/41 474/268 |

FOREIGN PATENT DOCUMENTS

| | | |
|---|---|---|
| JP | 2008-115938 A | 5/2008 |
| JP | 2011-085160 A | 4/2011 |
| TW | 200745461 A | 12/2007 |
| TW | 202124858 A | 7/2021 |
| WO | 2011-045984 A1 | 4/2011 |
| WO | 2018-155722 A1 | 8/2018 |

OTHER PUBLICATIONS

Aug. 4, 2023—(TW) Office Action—App 111136891.
Jun. 9, 2025—(KR) Office Action—App 10-2024-7009660.

* cited by examiner

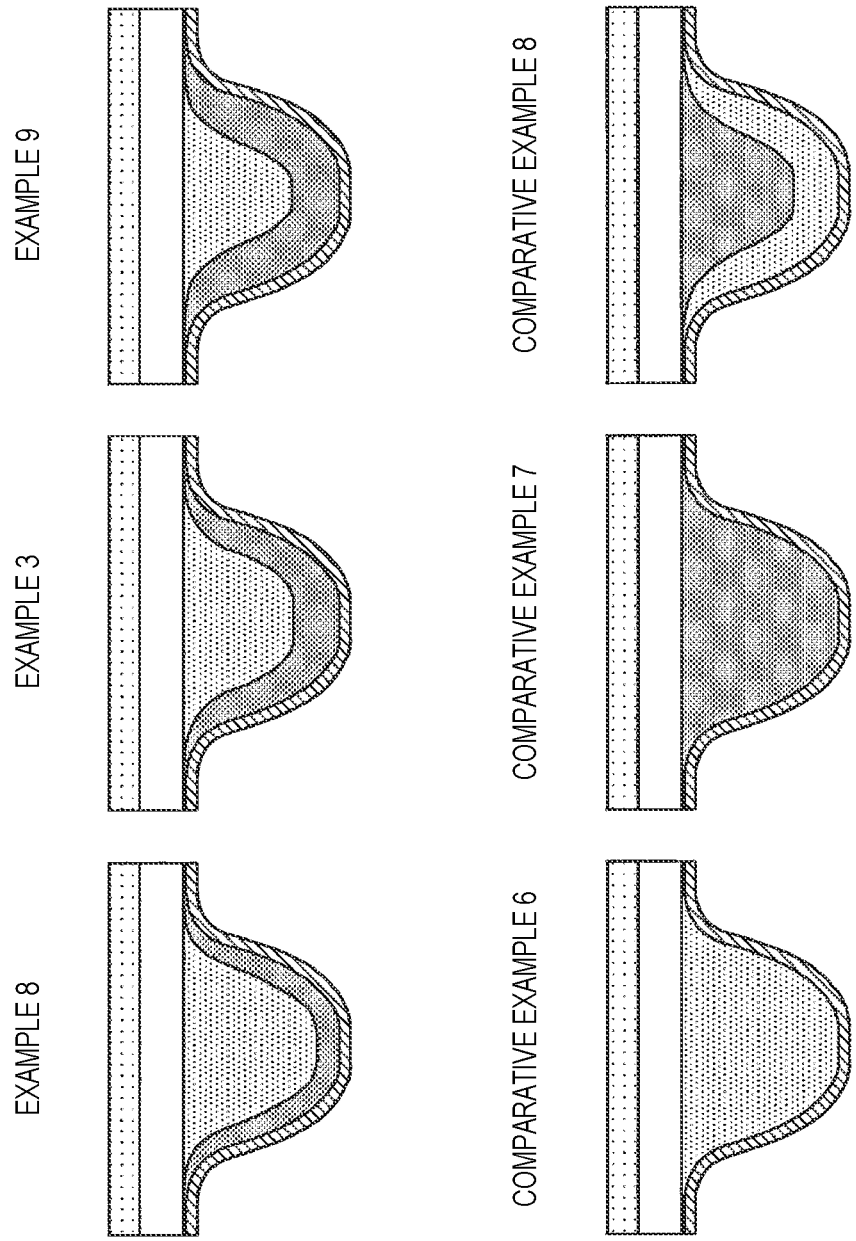

TOOTHED BELT AND MANUFACTURING METHOD THEREFOR

CROSS REFERENCE TO RELATED APPLICATIONS

This is a U.S. National Phase Application under 35 U.S.C. § 371 of International Application No. PCT/JP2022/036042, filed Sep. 27, 2022, which claims priority to Japanese Application Nos. 2021-159743, filed Sep. 29, 2021, 2022-086291, filed May 26, 2022, and 2022-143790, filed Sep. 9, 2022, which were published Under PCT Article 21(2), the entire contents of which are incorporated herein by reference.

TECHNICAL FIELD

The present invention relates to a rubber toothed belt (or a rubber toothed belt with a tooth fabric covering the toothed belt) which meshes with a toothed pulley and is useful for synchronously transmitting power in a general industrial machine or the like under a high load condition, and a manufacturing method therefor.

BACKGROUND ART

A power-transmission belt that transmits power is roughly classified into a frictional power-transmission belt and a synchronous power-transmission belt. Examples of the frictional power-transmission belt include a flat belt, a V belt, and a V-ribbed belt, and examples of the synchronous power-transmission belt include a toothed belt. The toothed belt includes a back portion in which a tension member is embedded substantially parallel to a belt circumferential direction, tooth portions arranged at predetermined intervals in the belt circumferential direction, and a tooth fabric covering a surface of the tooth portions. The tooth portions of the toothed belt transmit power by being fitted to a pulley having grooves facing the tooth portions. As a slip does not occur between the toothed belt and the pulley, the toothed belt can reliably transmit the power even with a high load. In recent years, there has been an increasing number of examples used for industrial machines, internal combustion engines of automobiles, and rear-wheel drive of motorcycles, and in particular, with miniaturization of machines, there is a demand for toothed belts (compatible with small diameter pulleys and having a smaller width) that are compatible with the miniaturization. When a miniaturized toothed belt is used in the same environment as a large-sized toothed belt in related art, a higher load acts on the toothed belt. Therefore, there is a need for a toothed belt having high durability that can withstand use under a condition in which a higher load acts while also being compatible with the miniaturization.

One of important factors for durability of a toothed belt is a rigidity (deformation resistance) of a tooth portion. In a process of meshing with a toothed pulley, repeated deformation of a tooth portion due to contact with the toothed pulley may lead to a failure such as a meshing failure due to tooth skipping (jumping) or tooth chipping due to a crack in a tooth root portion. The tooth chipping is a form of a failure in which a tooth portion is missing from a belt main body, and a mechanism thereof is considered to be such that in a process in which stress is concentrated on a root of the tooth portion due to repeated deformation of the tooth portion, first, a minute crack occurs at a tooth root, and then the crack is grown. In particular, when the toothed belt is used under a condition in which a high load acts, stress concentrated on a tooth root portion becomes particularly large, and a crack is likely to occur starting from the tooth root to lead to the tooth chipping. Specifically, in many cases, a minute crack that occurs mainly on a tooth portion surface of the tooth root portion or in the vicinity of the surface progresses (grows) toward an inside of a tooth rubber forming the tooth portion to cause the tooth chipping.

Therefore, it is necessary to increase the rigidity in order to prevent the deformation of the tooth portion. On the other hand, when the rigidity of the tooth portion is increased, a bending rigidity of the belt is also increased, and bendability is deteriorated. When the toothed pulley is miniaturized (become smaller in diameter) in accordance with the miniaturization of the machines, high bendability (flexibility) is also required so that the toothed belt is wound around a small diameter pulley to provide a good meshing property. A measurement of increasing the rigidity of the tooth portion is not suitable for improving the bendability. On the other hand, even when a minute crack occurs, if it is possible to prevent the growth of the minute crack that leads to the tooth chipping, the tooth chipping can be prevented.

That is, in the toothed belt, the rigidity (deformation resistance) of the tooth portion and the bendability (flexibility) have a contradictory relationship and are difficult to be achieved at the same time, and thus a balanced measurement is required to achieve both the rigidity and the bendability, and when the minute crack occurs due to long-term use or the like, it is necessary to prevent the growth of the crack.

JP2011-85160A (Patent Literature 1) discloses a toothed belt in which an intermediate canvas having an elastic modulus in a belt width direction of 100 GPa or more is embedded inside a belt main body in which tooth portions and tooth bottom portions are alternately provided along a longitudinal direction on one surface, and describes the tooth portion which is formed by a core rubber layer constituting an inside of the tooth portion and a tooth rubber layer disposed along an outer periphery of the tooth portion and laminated on a side of the core rubber layer on the one surface, and in which a modulus of the core rubber layer is larger than a modulus of the tooth rubber layer.

In addition, WO2011/045984 (Patent Literature 2) discloses a toothed belt including a belt main body in which tooth portions and tooth bottom portions are alternately provided along a longitudinal direction on one surface, and describes the belt main body portion which includes a tooth rubber layer disposed along an outer periphery of the tooth portion and a core rubber layer constituting an inside of the tooth portion, and in which the core rubber layer has a larger modulus than the tooth rubber layer.

Further, JP2008-115938A (Patent Literature 3) discloses a toothed belt including a tooth rubber layer in which tooth portions and tooth bottom portions are alternately formed along a longitudinal direction on one surface, a back rubber layer formed on the other surface of the belt, an adhesion rubber layer formed between the tooth rubber layer and the back rubber layer, and a tension member embedded inside the adhesion rubber layer, in which short fibers oriented along a surface of the tooth rubber layer are mixed in the tooth rubber layer, and short fibers oriented in a thickness direction of the belt are mixed in the adhesion rubber layer. The literature discloses that when the short fibers are aramid fibers, a proportion of the short fibers is, for example, 1 part by mass to 10 parts by mass and preferably 1 part by mass to 5 parts by mass with respect to 100 parts by mass of matrix rubber, and in Examples, an amount of both the tooth rubber layer and the adhesion rubber layer is 4 parts by mass with respect to 100 parts by mass of the matrix rubber. In Examples, a rubber composition of the tooth rubber layer and a rubber composition of the adhesion rubber layer have the same composition.

CITATION LIST

Patent Literature

Patent Literature 1. JP2011-85160A
Patent Literature 2: WO2011/045984
Patent Literature 3: JP2008-115938A

SUMMARY OF INVENTION

Technical Problem

However, even in the toothed belts of Patent Literatures 1 to 3, it is difficult to achieve both rigidity of the tooth portions and bendability of the toothed belt, and a crack is likely to occur. Further, these toothed belts do not have sufficient tooth chipping resistance, and even if a crack that occurs is a minute crack, a crack immediately progresses starting from the minute crack, resulting in tooth chipping, and thus durability is also low.

Therefore, an object of the present invention is to provide a toothed belt capable of achieving both rigidity (deformation resistance) of a tooth portion and bendability (flexibility) and having excellent tooth chipping resistance (durability), and a manufacturing method therefor.

Solution to Problem

In order to achieve the above object, the present inventors have focused on a layer structure (distribution of mechanical properties) in a rubber layer constituting a tooth portion, have intensively studied a balanced aspect in which rigidity (deformation resistance) of a tooth portion and bendability (flexibility) which have a contradictory relationship can be both achieved while securing the rigidity of the tooth portion that can withstand use under a condition in which a higher load acts, and have also studied a compounding component of the rubber layer in order to improve tooth chipping resistance. As a result, the present inventors have found that both rigidity of a tooth portion and bendability can be achieved, and tooth chipping resistance can be also improved by forming a tooth portion of a toothed belt by a first rubber layer and a second rubber layer that is formed between the first rubber layer and a tension member, adjusting an elastic modulus of the first rubber layer to be larger than an elastic modulus of the second rubber layer, and compounding short fibers in the first rubber layer in a manner of being oriented in a belt longitudinal direction along a contour of the tooth portion, and have completed the present invention.

That is, a toothed belt according to an aspect [1] of the present invention is a toothed belt, including:
- a back portion in which a tension member extending along a belt circumferential direction is embedded;
- a plurality of tooth portions formed on an inner circumferential surface of the back portion at intervals in the belt circumferential direction;
- a back rubber layer formed on a belt outer circumferential side with respect to the tension member; and
- a first rubber layer and a second rubber layer that are formed on a belt inner circumferential side with respect to the tension member, in which
the back portion includes the back rubber layer,
an elastic modulus of the first rubber layer is larger than an elastic modulus of the second rubber layer,
the first rubber layer includes a first crosslinked rubber composition including a first rubber component and a first short fiber,
a proportion of the first short fiber is 5 parts by mass to 60 parts by mass with respect to 100 parts by mass of the first rubber component,
the first short fiber is oriented in a belt longitudinal direction along a contour of the tooth portion, and
the tooth portion includes the first rubber layer and the second rubber layer that is interposed between the first rubber layer and the tension member.

An aspect [2] of the present invention is an aspect in which
an area proportion of the first rubber layer is 10 area % to 80 area % with respect to a total area of the first rubber layer and the second rubber layer in a cross-sectional view in the belt circumferential direction.

An aspect [3] of the present invention is an aspect according to the aspect [1] or [2], in which
a tensile strength of the first rubber layer in the belt circumferential direction is 40 MPa to 90 MPa,
a tensile elastic modulus of the first rubber layer in a belt width direction is 4 MPa to 25 MPa,
a tensile strength of the second rubber layer in the belt circumferential direction is 10 MPa to 50 MPa, and
a tensile elastic modulus of the second rubber layer in the belt width direction is 1 MPa to 10 MPa.

An aspect [4] of the present invention is an aspect according to any one of the aspects [1] to [3], in which
the tensile elastic modulus of the first rubber layer in the belt width direction is 1.1 times to 10 times the tensile elastic modulus of the second rubber layer in the belt width direction.

An aspect [5] of the present invention is an aspect according to any one of the aspects [1] to [4], in which
the first short fiber is a polyamide fiber.

An aspect [6] of the present invention is an aspect according to any one of the aspects [1] to [5], in which
the first crosslinked rubber composition further includes a first crosslinking agent and a first co-crosslinking agent,
the second rubber layer includes a second crosslinked rubber composition including a second rubber component, a second crosslinking agent, and a second co-crosslinking agent,
the first rubber component includes a first composite polymer including a hydrogenated nitrile rubber and an unsaturated carboxylic acid metal salt,
the second rubber component includes a second composite polymer including a hydrogenated nitrile rubber and an unsaturated carboxylic acid metal salt,
a proportion of the first co-crosslinking agent is 1 part by mass to 40 parts by mass with respect to 100 parts by mass of the first rubber component, and
a proportion of the second co-crosslinking agent is 0.2 parts by mass to 25 parts by mass with respect to 100 parts by mass of the second rubber component.

An aspect [7] of the present invention is an aspect according to the aspect [6], in which
the second crosslinked rubber composition further includes a second short fiber, and a proportion of the second short fiber in the second crosslinked rubber composition is 5 parts by mass or less with respect to 100 parts by mass of the second rubber component.

An aspect [8] of the present invention is an aspect according to the aspect [6] or [7], in which
the first crosslinked rubber composition further includes a first reinforcing inorganic filler,
the second crosslinked rubber composition further includes a second reinforcing inorganic filler,
a proportion of the first composite polymer in the first rubber component is 80 mass % or more,
a proportion of the second composite polymer in the second rubber component is 30 mass % or more,
the first crosslinking agent includes a first organic peroxide, and a proportion of the first organic peroxide is 1 part by mass to 20 parts by mass with respect to 100 parts by mass of the first rubber component,
the second crosslinking agent includes a second organic peroxide, and a proportion of the second organic peroxide is 0.5 parts by mass to 5 parts by mass with respect to 100 parts by mass of the second rubber component,
a proportion of the first reinforcing inorganic filler is 10 parts by mass or less with respect to 100 parts by mass of the first rubber component, and
a proportion of the second reinforcing inorganic filler is 10 parts by mass or less with respect to 100 parts by mass of the second rubber component.

The present invention also includes, as an aspect [9], a manufacturing method for the toothed belt according to any one of the aspects [1] to [8], the method including:
a first rubber layer precursor preparation step of preparing an uncrosslinked rubber sheet in which a first short fiber is oriented in one direction of a sheet surface as a first rubber layer precursor for forming a first rubber layer; and
a preforming step of laminating the first rubber layer precursor and a second rubber layer precursor, which is an uncrosslinked rubber sheet for forming a second rubber layer, in an arrangement in which the first short fiber is oriented in a belt longitudinal direction to prepare a pre-formed body in a semi-crosslinked state.

Advantageous Effects of Invention

In the present invention, the tooth portion of the toothed belt is formed by the first rubber layer and the second rubber layer that is formed between the first rubber layer and the tension member, the elastic modulus of the first rubber layer is adjusted to be larger than the elastic modulus of the second rubber layer, the first rubber layer is made of the first crosslinked rubber composition including 100 parts by mass of the first rubber component and 5 parts by mass to 60 parts by mass of the first short fiber, and the first short fiber is oriented in the belt longitudinal direction along the contour of the tooth portion (contour of the first rubber layer or tooth fabric surface). Therefore, while securing rigidity of the tooth portion that can withstand use under a condition in which a higher load acts, it is possible to achieve both the rigidity of the tooth portion and bendability which have a contradictory relationship, and it is also possible to improve tooth chipping resistance. Therefore, according to the present invention, it is possible to provide a toothed belt capable of preventing jumping (tooth skipping) during running of the belt and improving belt durability. In the toothed belt, it is also possible to prevent chipping of the tooth portion (tooth chipping) due to growth of a minute crack that occurs during running, and it is possible to achieve a long life during running with a high load.

BRIEF DESCRIPTION OF DRAWINGS

FIG. 8 shows schematic cross-sectional views of respective tooth portions of toothed belts obtained in Examples.

DESCRIPTION OF EMBODIMENTS

<Toothed Belt>

Hereinafter, an example of a toothed belt of the present invention will be described in detail with reference to the drawings as necessary.

Figure 1:
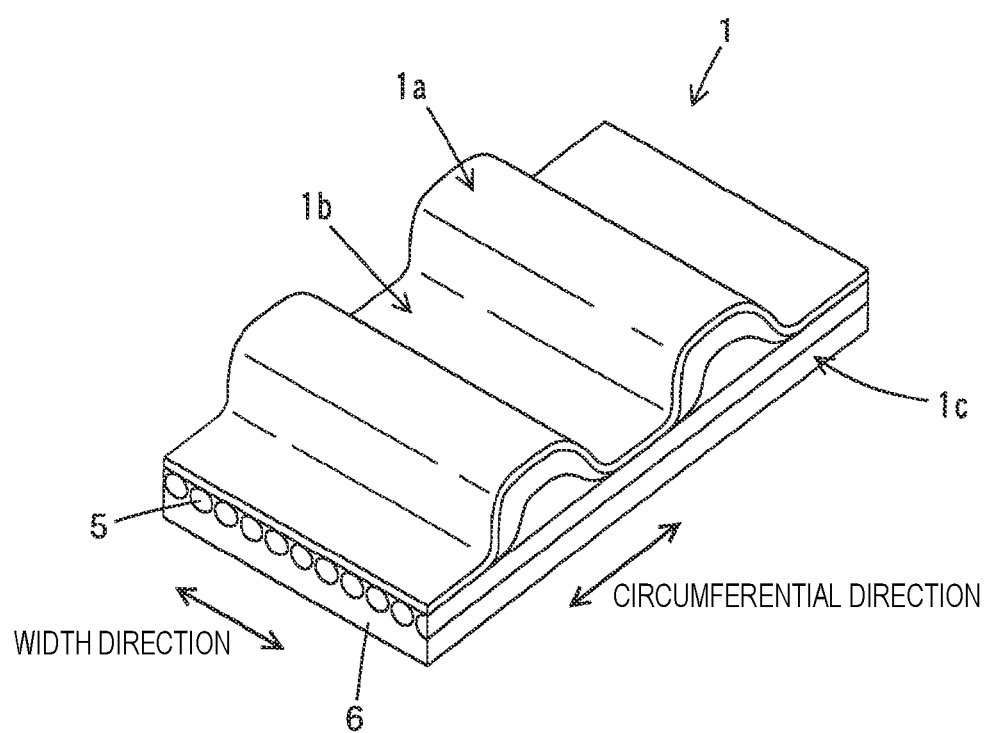
FIG. 1 is a partial cross-sectional perspective view showing an example of a toothed belt of the present invention.
Figure 2:
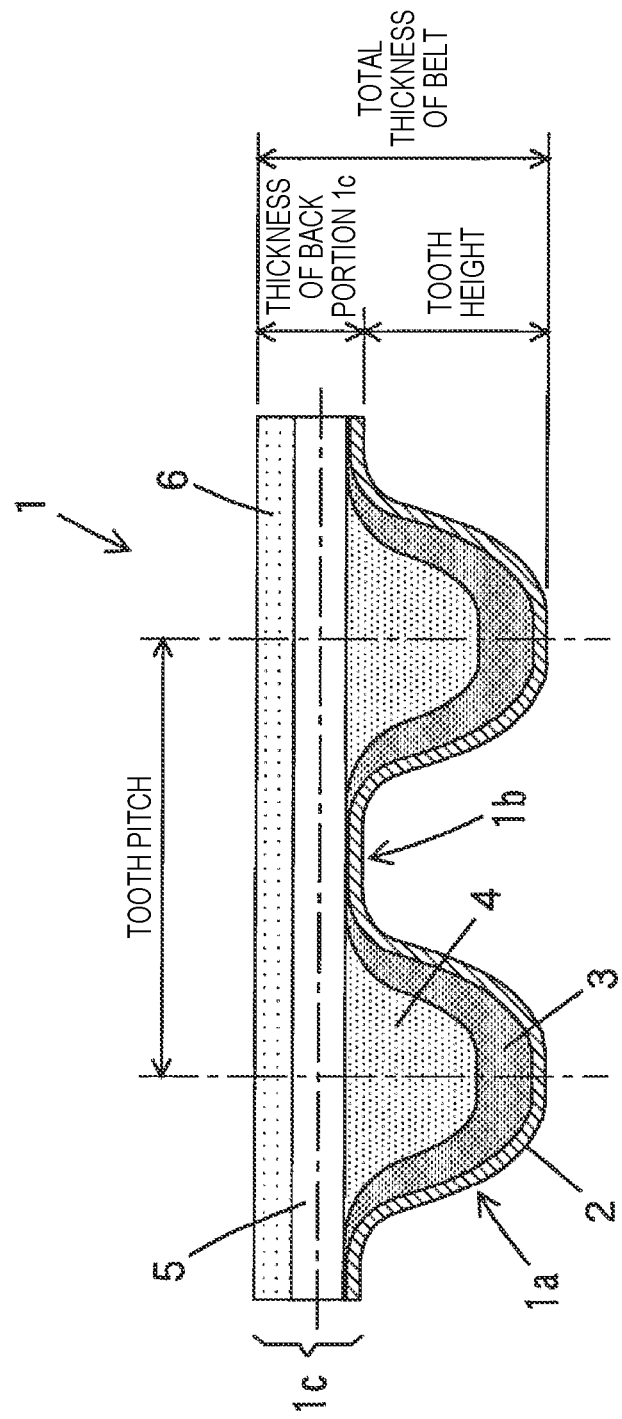
FIG. 2 is a schematic cross-sectional view of the toothed belt of FIG. 1.

FIG. 1 is a partial cross-sectional perspective view showing an example of the toothed belt of the present invention, and FIG. 2 is a schematic cross-sectional view of the toothed belt of FIG. 1. A toothed belt 1 in this example is an endless synchronous power-transmission belt, and includes a back portion 1c in which tension members 5 extending in a belt circumferential direction (longitudinal direction) are embedded, and a plurality of tooth portions 1a provided at predetermined intervals on an inner circumferential surface of the back portion 1c and extending in a belt width direction, and a belt surface (inner circumferential surface) on a tooth portion side is constituted by a tooth fabric 2. The back portion 1c includes a back rubber layer 6 disposed on a belt outer circumferential surface side of the tension member 5, and the back rubber layer 6 forms a belt outer circumferential surface. Further, the toothed belt 1 of the present invention includes a first rubber layer (surface rubber layer) 3 and a second rubber layer (internal rubber layer) 4 between the tooth fabric 2 and the tension member 5 on a belt inner circumferential surface side of the tension member 5. The first rubber layer 3 is disposed on a belt inner circumferential surface along a contour of the tooth fabric 2 (in contact with the tooth fabric 2), and the second rubber layer 4 is interposed or disposed between the first rubber layer 3 and the tension member 5 (in contact with the tension member 5). The first rubber layer 3 has a larger elastic modulus (in particular, tensile elastic modulus) than the second rubber layer 4.

A flat tooth bottom portion 1b is present between the adjacent tooth portions 1a, and the tooth portion 1a and the tooth bottom portion 1b are formed alternately along the circumferential direction (belt longitudinal direction) on the belt inner circumferential surface. That is, a surface of the tooth portion 1a and an inner circumferential surface of the back portion 1c (that is, a surface of the tooth bottom portion 1b) are constituted by one continuous tooth fabric 2.

In the embodiment shown in FIG. 1, a tooth fabric constituting the surface of the tooth portion is a component of the tooth portion, while a tooth fabric constituting the surface of the tooth bottom portion is a component of the back portion. Each tooth fabric constituting the tooth portion is a part of a continuous tooth fabric (part of the tooth fabric 2 shown in FIG. 2).

In this example, the tooth portion 1a has a cross-sectional shape of substantially trapezoidal shape in the belt circumferential direction. The tooth portion 1a having a substantially trapezoidal cross-sectional shape has a circumferential surface constituted by the tooth fabric 2, and includes the first rubber layer 3 formed along the tooth fabric 2 and the second rubber layer 4 that is formed between the first rubber layer 3 and the tension member 5. Also in the tooth bottom portion 1b, a first rubber layer (not shown) as a surface rubber layer and a second rubber layer (not shown) as an internal rubber layer are interposed between the tooth fabric 2 and the tension member 5. A thickness of the first rubber layer and the second rubber layer in the tooth bottom portion is extremely thin as compared with a thickness of the first rubber layer 3 and the second rubber layer 4 in the tooth portion 1a.

The tension members 5 extend in the belt longitudinal direction (circumferential direction) and are arranged at intervals in the belt width direction. A gap between the adjacent tension members 5 may be made of a crosslinked rubber composition constituting the back rubber layer 6 and/or the second rubber layer (in particular, crosslinked rubber composition constituting the back rubber layer 6).

The toothed belt is used for a high-load power-transmission application in industrial machines, internal combustion engines of automobiles, rear-wheel drive of motorcycles, or the like. For example, in a state in which the toothed belt is wound between a driving pulley (toothed pulley) and a driven pulley (toothed pulley), power is transmitted from a driving pulley side to a driven pulley side by rotation of the driving pulley.

The toothed belt of the present invention is not limited to the form and the structure shown in FIGS. 1 and 2. For example, as long as the plurality of tooth portions can mesh with the toothed pulley, a cross-sectional shape of each of the tooth portions (cross-sectional shape of the toothed belt in the belt circumferential direction) is not limited to a substantially trapezoidal shape, and may be, for example, a semicircular shape, a semielliptical shape, or a polygonal shape [triangular shape, quadrilateral shape (such as rectangular shape, trapezoidal shape), or the like]. Among these, a trapezoidal shape or a substantially trapezoidal shape is preferred from the viewpoint of synchronous power-transmission properties and the like.

In the toothed belt (inner circumferential side of the tension member) of the present invention, an area proportion of the first rubber layer is, for example, 10 area % to 80 area %, preferably 20 area % to 70 area %, more preferably 30 area % to 60 area %, and still more preferably 35 area % to 50 area % with respect to a total area of the first rubber layer and the second rubber layer in a cross-sectional view in the belt circumferential direction (belt longitudinal direction). If this area proportion is too small, rigidity (deformation resistance) of the tooth portion may be insufficient, whereas if the area proportion is too large, bending rigidity of the belt may be high and bendability (flexibility) may be insufficient.

In the toothed belt of the present invention, an average distance (tooth pitch, see FIG. 2) between centers of the tooth portions adjacent to each other in the circumferential direction may be, for example, 2 mm to 25 mm depending on a form of a toothed pulley or the like. A numerical value of the tooth pitch also corresponds to a size of a scale of the tooth portion (length of the tooth portion in the belt circumferential direction and a tooth height of the tooth portion). That is, as the tooth pitch becomes larger, the scale of the tooth portion becomes larger similarly. In particular, in an application where a high load acts, a tooth portion having a large scale is required, and a tooth pitch may be 5 mm or more, preferably 8 mm or more, and more preferably 14 mm or more.

Further, an average tooth height of the tooth portions is preferably 40% to 70%, and more preferably 50% to 65% with respect to an average thickness of the entire belt.

In the present application, as shown in FIG. 2, an average tooth height of the tooth portions refers to an average height of the tooth portions protruding from the belt inner circumferential surface (average height of the tooth portions protruding from the tooth bottom portion).

[Tooth Portion]

The tooth portion includes the first rubber layer disposed on a surface side (inner surface side) and the second rubber layer disposed on an inner side in contact with the first rubber layer. The first rubber layer and the second rubber layer are made of different crosslinked rubber compositions, and an elastic modulus (modulus) of the first rubber layer is relatively large and an elastic modulus (modulus) of the second rubber layer is relatively small. In the toothed belt of the present invention, since a crosslinked rubber composition forming the tooth portion has such a two-layer structure, both the rigidity of the tooth portion and the bendability can be achieved. This mechanism will be described with reference to FIG. 3. In the present application, when the tooth portion includes the tooth fabric, a rubber layer forming the tooth portion refers to a rubber layer interposed between the tension member and the tooth fabric, and when the tooth portion does not include the tooth fabric, the rubber layer refers to a rubber layer interposed on the inner circumferential surface side with respect to the tension member. The first rubber layer and the second rubber layer, which are the rubber layers forming the tooth portion, are collectively referred to as a tooth rubber layer.

The tooth portion may further include the tooth fabric constituting the surface thereof. When the tooth portion does not include the tooth fabric, a surface of the first rubber layer forms the belt inner circumferential surface, and when the tooth portion includes the tooth fabric, a surface of the tooth rubber layer is covered with the tooth fabric, and the belt inner circumferential surface is constituted by the tooth fabric. That is, when the tooth portion includes the tooth fabric, the tooth portion includes the first rubber layer having the surface constituted by the tooth fabric and disposed on the surface side in contact with the tooth fabric along a contour of the tooth portion, and the second rubber layer disposed on the inner side in contact with the first rubber layer.

The present inventors have found that, in an inside of the tooth portion, a portion that affects the bendability (flexibility) is an inside of the tooth portion corresponding to the second rubber layer, in particular, a portion C located below the tension member 5. That is, the present inventors have found that the bendability (flexibility) is deteriorated when the inside of the tooth portion, in particular, the portion C is a rubber layer having high rigidity (high elastic modulus). Therefore, in the toothed belt of the present invention, in order to ensure high bendability, the second rubber layer located inside the tooth portion, in particular, the second rubber layer 4 including the portion C, is adjusted to have relatively low rigidity (low elastic modulus).

Further, the present inventors have found that, in the inside of the tooth portion, a portion that affects the deformation resistance is a portion in the vicinity of the tooth fabric corresponding to the first rubber layer, in particular, a portion A located on a side surface of the tooth portion and a portion B located in the vicinity of the tooth bottom portion. That is, the present inventors have found that the deformation resistance is deteriorated when the portion A and the portion B are rubber layers having low rigidity (low elastic modulus). Specifically, since the portion A, which is the side surface of the tooth portion, is a portion that comes into contact with the pulley and receives a maximum load (impact), it is effective that a crosslinked rubber composition of the portion A has high rigidity (high elastic modulus). On the other hand, the portion B, which is a root in the vicinity of the tooth bottom portion, is a portion where a minute crack first occurs due to repeated deformation (starting point portion leading to tooth chipping), and thus it is effective that a crosslinked rubber composition of the portion B has high rigidity (high elastic modulus). Therefore, in the toothed belt of the present invention, in order to ensure the deformation resistance, the first rubber layer 3 including the portion A and the portion B is adjusted to have relatively high rigidity (high elastic modulus).

From the viewpoint of the deformation resistance, in the tooth portion, it is sufficient that at least the portion A and the portion B are made of high rigidity rubber, and a top portion of the tooth portion (tooth tip portion) may not be made of high rigidity rubber. On the other hand, in the toothed belt of the present invention, from the viewpoint of achieving high productivity and high deformation resistance, the first rubber layer including the top portion is made of high rigidity rubber.

A tensile strength of the first rubber layer in the belt circumferential direction is, for example, 40 MPa to 90 MPa, preferably 45 MPa to 85 MPa, more preferably 50 MPa to 83 MPa, still more preferably 55 MPa to 80 MPa, and most preferably 60 MPa to 80 MPa. If the tensile strength is too small, the rigidity of the tooth portion may decrease and the deformation resistance may be deteriorated, whereas if the tensile strength is too large, the bendability of the belt, in particular, a winding (meshing) property on a small diameter pulley may be deteriorated.

A tensile strength of the second rubber layer in the belt circumferential direction is, for example, 10 MPa to 50 MPa, preferably 20 MPa to 45 MPa, more preferably 25 MPa to 40 MPa, still more preferably 25 MPa to 35 MPa, and most preferably 30 MPa to 35 MPa. If the tensile strength is too small, the deformation resistance may be deteriorated, whereas if the tensile strength is too large, the bendability of the belt, in particular, the winding (meshing) property on the small diameter pulley may be deteriorated.

In the belt circumferential direction, the tensile strength of the first rubber layer is larger than the tensile strength of the second rubber layer, and a ratio of the tensile strength of the first rubber layer to the tensile strength of the second rubber layer (tensile strength of the first rubber layer/tensile strength of the second rubber layer) may be 1.3 to 3.5, preferably 1.5 to 3.3, more preferably 1.8 to 3, still more preferably 2 to 2.7, and most preferably 2.2 to 2.5. By setting the ratio of the tensile strengths of both layers to be within this range, the rigidity (deformation resistance) of the tooth portion and the bendability (flexibility) which have a contradictory relationship are balanced, and both can be achieved.

In the present application, as the tensile strength of each of the first rubber layer and the second rubber layer, a value of a "tensile strength T" of each rubber layer that can be measured by a method in accordance with JIS K6251 (2017) is used as an index value of the tensile strength. Specifically, the tensile strength can be measured by a method described in Examples to be described later.

A tensile elastic modulus (modulus) of the first rubber layer may be selected from a range of, for example, about 4 MPa to 25 MPa in the belt width direction, and is, for example, 5 MPa to 20 MPa, preferably 6 MPa to 18 MPa, more preferably 8 MPa to 16 MPa, still more preferably 10 MPa to 15 MPa, and most preferably 12 MPa to 15 MPa. If the tensile elastic modulus is too small, the rigidity of the tooth portion may decrease and the deformation resistance may be deteriorated, whereas if the tensile elastic modulus is too large, the bendability of the belt, in particular, the winding (meshing) property on the small diameter pulley may be deteriorated.

A tensile elastic modulus (modulus) of the second rubber layer in the belt width direction is, for example, 1 MPa to 10 MPa, preferably 2 MPa to 5 MPa, more preferably 3 MPa to 4.5 MPa, and still more preferably 3.5 MPa to 4 MPa. If the tensile elastic modulus is too small, the deformation resistance may be deteriorated, whereas if the tensile elastic modulus is too large, the bendability of the belt, in particular, the winding (meshing) property on the small diameter pulley may be deteriorated.

In the belt width direction, the tensile elastic modulus of the first rubber layer is larger than the tensile elastic modulus of the second rubber layer, and a ratio of the tensile elastic modulus of the first rubber layer to the tensile elastic modulus of the second rubber layer (tensile elastic modulus of the first rubber layer/tensile elastic modulus of the second rubber layer) may be 1.1 to 10, and is, for example, 2 to 7, preferably 2 to 5, more preferably 2.2 to 5 (for example, 2.5 to 5), still more preferably 3 to 4.5, and most preferably 3.5 to 4. By setting the ratio of the tensile elastic moduli of both layers to be within this range, the rigidity (deformation resistance) of the tooth portion and the bendability (flexibility) which have a contradictory relationship are balanced, and both can be achieved.

In the present application, as the tensile elastic modulus (modulus) of each of the first rubber layer and the second rubber layer, a value of a "tensile stress at 2% elongation" of each rubber layer that can be measured by a method in accordance with JIS K6251 (2017) is used as an index value of the tensile elastic modulus (modulus). Specifically, the tensile elastic modulus can be measured by a method described in Examples to be described later.

Further, in the tooth portion, the first rubber layer is made of a first crosslinked rubber composition containing a first rubber component and first short fibers, and the first short fibers are oriented in the belt longitudinal direction (belt circumferential direction) along the contour of the tooth portion. In the toothed belt of the present invention, by adjusting the tooth portion to have the above two-layer structure, both the rigidity and the bendability can be achieved, and a minute crack mainly occurring in a tooth root can be prevented, and even when a minute crack occurs due to long-term use or the like, it is possible to prevent the tooth chipping of the toothed belt and improve tooth chipping resistance (durability) of the belt by orienting the first short fibers in the direction in the first rubber layer. The mechanism of improving the tooth chipping resistance will be described with reference to FIGS. 4 and 5.

Figure 4:
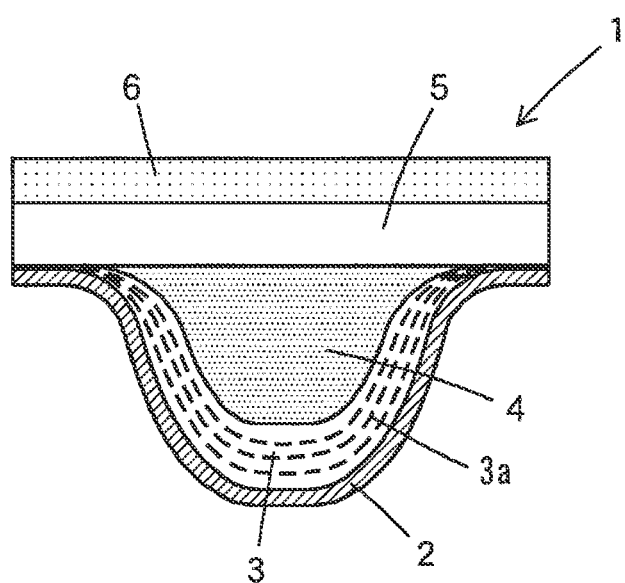
FIG. 4 is a schematic cross-sectional view illustrating an orientation state of short fibers of the toothed belt of FIG. 1.
Figure 5:
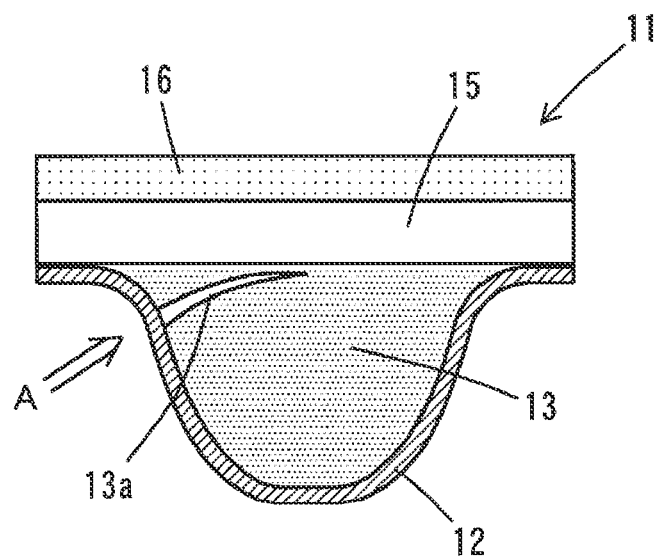
FIG. 5 is a schematic cross-sectional view illustrating a state in which a crack occurs in the toothed belt.

FIG. 4 is a schematic cross-sectional view illustrating an orientation state of the short fibers of the toothed belt of FIG. 1, and FIG. 5 is a schematic cross-sectional view illustrating a state in which a crack occurs in the toothed belt.

As shown in FIG. 5, a toothed belt 11 includes a tooth fabric 12, a tooth rubber layer 13 covered with the tooth fabric 12, a back rubber layer 16, and a tension member 15 interposed between the tooth rubber layer 13 and the back rubber layer 16, and a minute crack is likely to occur on a rubber surface of a tooth root of the tooth rubber layer 13 or in the vicinity of the surface. The minute crack that occurs progresses from the rubber surface toward an inside of the tooth rubber layer 13 in a substantially perpendicular direction (direction of an arrow A in FIG. 5), grows into a crack 13a, and leads to tooth chipping.

On the other hand, as shown in FIG. 4, in the toothed belt 1 of the present invention, the first rubber layer 3 located on a tooth fabric 2 side includes first short fibers 3a. FIG. 4 is a view schematically showing a dispersion state of the first short fibers 3a in the first rubber layer 3 in order to illustrate an orientation direction of the first short fibers 3a, and in an inside of the first rubber layer 3, the first short fibers 3a are oriented in the belt longitudinal direction along the contour of the tooth fabric 2 (surface direction of the tooth fabric). That is, the first short fibers 3a are oriented substantially parallel to the surface direction of the tooth fabric in the inside of the first rubber layer 3. The orientation direction of the first short fibers 3a is a direction intersecting with (in particular, a direction substantially orthogonal to) a direction in which a minute crack progresses (direction extending inward from a tooth fabric surface, such as the direction of the arrow A in FIG. 5, or a direction substantially perpendicular to the tooth fabric surface), and thus when the first rubber layer 3 includes the first short fibers 3a at a predetermined proportion, the first short fibers 3a, which are in a form intersecting with or substantially orthogonal to the progressing direction, are normally present in the progressing direction of the minute crack that occurs on the surface or the inside of the first rubber layer 3. Therefore, in the first rubber layer 3 of the toothed belt 1 of the present invention, the first short fibers 3a have a function of preventing (guarding) the progress of the minute crack, and even if the minute crack occurs due to repeated deformation, the progress of the crack can be prevented, and the tooth chipping resistance of the toothed belt can be improved. A proportion of the first short fibers for exhibiting such a function is about 5 parts by mass to 60 parts by mass, and in particular, 10 parts by mass to 60 parts by mass, with respect to 100 parts by mass of the first rubber component. On the other hand, in a toothed belt of Patent Literature 3 in which a tooth rubber layer includes short fibers, a proportion of the short fibers is small, and thus progress of a crack cannot be effectively prevented, tooth chipping resistance cannot be improved, a modulus between the tooth rubber layer and an adhesion rubber layer is not adjusted, and a minute crack itself is likely to occur.

In the present application, a state in which the first short fibers are oriented along the contour of the tooth portion refers to not only a state in which the first short fibers are oriented substantially parallel to the contour of the tooth portion, but also a state in which the first short fibers are oriented substantially parallel to the contour of the tooth fabric. The same applies to a state in which the first short fibers are oriented in the belt longitudinal direction.

In the present application, the "contour of the tooth portion" may be a contour of the first rubber layer, or may be a tooth fabric surface or an interface between the tooth fabric and the first rubber layer when the tooth portion includes the tooth fabric, or an interface between the first rubber layer and the second rubber layer. In particular, whether the first short fibers are oriented along the contour of the tooth portion may be determined based on the interface between the first rubber layer and the second rubber layer, and for example, when the first short fibers are substantially parallel to the corresponding interface (corresponding portion of the interface at a shortest distance from the first short fibers), it may be determined that the first short fibers are oriented along the contour of the tooth portion.

Figure 3:
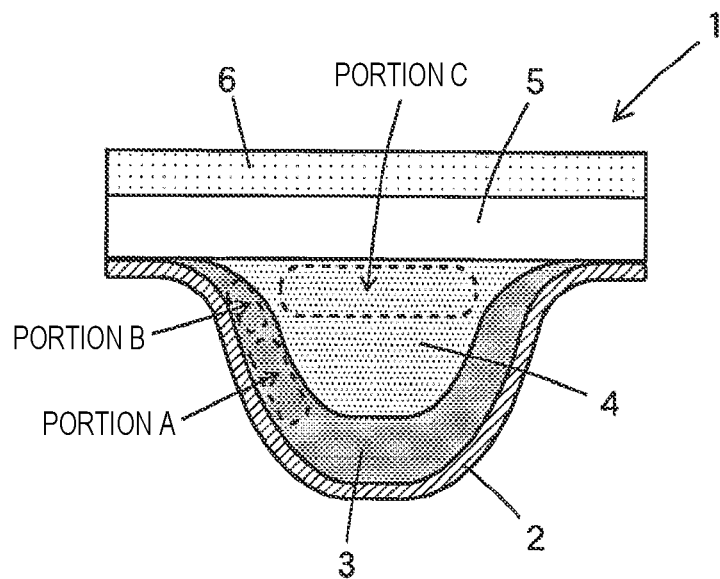
FIG. 3 is a schematic cross-sectional view illustrating a function of a tooth portion of the toothed belt of FIG. 1.

A shape of the first rubber layer is not particularly limited as long as the first rubber layer has a layer shape formed along the tooth fabric, and is not limited to a layer shape having a non-uniform thickness shown in FIGS. 1 to 3 (that is, a shape in which a thickness of the layer is maximum at the top portion or a center portion of the tooth portion and decreases toward a bottom portion of the tooth portion in a cross-sectional view of the tooth portion in the belt longitudinal direction), and may be a layer shape having a uniform thickness. Among these, from the viewpoint of the productivity and the like, a layer shape having a non-uniform thickness (in particular, the shape in which the thickness of the layer is maximum at the top portion or the center portion of the tooth portion and decreases toward the bottom portion of the tooth portion in the cross-sectional view of the tooth portion in the belt longitudinal direction) is preferred.

In the tooth portion, an area proportion of the first rubber layer may be selected from a range of about 5 area % to 85 area % with respect to a total area of the first rubber layer and the second rubber layer in the cross-sectional view in the belt longitudinal direction (circumferential direction), and is, for example, 10 area % to 80 area %, preferably 20 area % to 70 area %, and more preferably 30 area % to 60 area %. If this area proportion is too small, the rigidity (deformation resistance) of the tooth portion may be insufficient, and a running property and durability of the belt may be deteriorated, whereas if the area proportion is too large, the bending rigidity of the belt may be high, the bendability (flexibility) may be insufficient, and the belt durability may be deteriorated. In an application where the belt durability is important, the area proportion is preferably 15 area % to 65 area %, and more preferably 20 area % to 60 area %.

A shape of the second rubber layer is not limited to a substantially trapezoidal shape formed between the first rubber layer and the tension member, and may be a layer shape formed along the first rubber layer, a substantially trapezoidal shape formed between the tension member and another rubber layer formed along the first rubber layer, or the like. Among these, from the viewpoint of improving the bendability of the tooth portion, a shape in contact with the tension member, that is, a substantially trapezoidal shape formed between the first rubber layer and the tension member, and a substantially trapezoidal shape formed between the other rubber layer and the tension member are preferred, and a substantially trapezoidal shape formed between the first rubber layer and the tension member is particularly preferred.

A rubber hardness Hs of the first rubber layer (first crosslinked rubber composition constituting the first rubber layer) is, for example, 65 degrees to 80 degrees, preferably 68 degrees to 78 degrees, more preferably 70 degrees to 76 degrees, and most preferably 70 degrees to 73 degrees in type D hardness. If the hardness is too small, the rigidity of the tooth portion may decrease and the deformation resistance may be deteriorated, whereas if the hardness is too large, the bendability of the belt, in particular, the winding (meshing) property on the small diameter pulley may be deteriorated.

A rubber hardness Hs of the second rubber layer (second crosslinked rubber composition constituting the second rubber layer) is, for example, 60 degrees to 66 degrees, preferably 62 degrees to 66 degrees, and more preferably 63 degrees to 66 degrees in type D hardness. If the hardness is too small, the deformation resistance may be deteriorated, whereas if the hardness is too large, the bendability of the belt, in particular, the winding (meshing) property on the small diameter pulley may be deteriorated.

In the present application, the type D hardness of each of the first rubber layer and the second rubber layer indicates a value Hs (type D) measured using a type D durometer in accordance with a spring type durometer hardness test specified in JIS K6253 (2012) (vulcanized rubber and thermoplastic rubber—hardness determining method —), and may be simply referred to as a rubber hardness. Specifically, the hardness can be measured by a method described in Examples to be described later, and can be measured as a hardness of a rubber sheet obtained by crosslinking a rubber composition for forming a belt.

Usually, a type A hardness (value measured using a type A durometer) is often used as a rubber hardness of a rubber composition, but when the value measured using the type A durometer exceeds 90 degrees, it is desirable to use a type D durometer. In the toothed belt of the present invention, a hardness of the rubber layer constituting the tooth portion is larger than a hardness of the back rubber layer to be described later, and exceeds 90 degrees in type A hardness. Therefore, the hardness of the rubber layer constituting the tooth portion is evaluated by type D hardness.

The tooth portion may further include another rubber layer as the tooth rubber layer in addition to the first rubber layer and the second rubber layer, as long as effects of the present invention are not impaired. Examples of the other rubber layer include an adhesion rubber layer interposed between the tooth fabric and the first rubber layer and an intermediate rubber layer interposed between the first rubber layer and the second rubber layer. The adhesion rubber layer may be a layer for improving adhesion between the tooth fabric and the first rubber layer. The intermediate rubber layer may be a layer having a tensile elastic modulus smaller than that of the first rubber layer and larger than that of the second rubber layer. Among these, the adhesion rubber layer (third rubber layer) is preferred. It is sufficient that a thickness of the adhesion rubber layer is a thickness that can improve the adhesion between the tooth fabric and the first rubber layer. Specifically, a thickness of the third rubber layer (adhesion rubber layer) is preferably 0.5 mm or less, and more preferably 0.3 mm or less in the top portion of the tooth portion. If the thickness of the third rubber layer is too large, the rigidity of the tooth portion may decrease.

As the structure of the tooth portion, a structure in which the tooth rubber layer includes only the adhesion rubber layer as another layer is preferred, and a structure not including another layer, that is, a structure including the first rubber layer and the second rubber layer that is formed between the first rubber layer and the tension member, or a structure including the tooth fabric covering the surface in the belt circumferential direction, the first rubber layer formed along the tooth fabric, and the second rubber layer formed between the first rubber layer and the tension member is particularly preferred.

(Crosslinked Rubber Composition)

The toothed belt of the present invention is characterized in that the first rubber layer is made of the first crosslinked rubber composition containing the first short fibers as an essential component, but both the first rubber layer and the second rubber layer may be made of a crosslinked rubber composition commonly used as a rubber composition for a toothed belt. The crosslinked rubber composition may be a crosslinked rubber composition containing a rubber component, and by appropriately adjusting a composition of the crosslinked rubber composition, mechanical properties such as an elastic modulus (modulus) of each layer constituting the rubber layer, particularly the first rubber layer and the second rubber layer, can be adjusted. A method for adjusting the elastic modulus (modulus) and the like is not particularly limited, and adjustment may be performed by changing compositions and/or types of components constituting the composition, and from the viewpoint of convenience and the like, it is preferable to perform the adjustment by changing proportions and/or types of crosslinking compounding agents, short fibers, and fillers.

(A) Rubber Component

Examples of the rubber component (first rubber component and second rubber component) of the crosslinked rubber composition forming the first rubber layer and the second rubber layer include a diene rubber [such as a natural rubber (NR), an isoprene rubber (IR), a butadiene rubber (BR), a chloroprene rubber (CR), a butyl rubber (IIR), a styrene-butadiene rubber (SBR), a vinylpyridine-styrene-butadiene rubber, an acrylonitrile-butadiene rubber (nitrile rubber: NBR), an acrylonitrile-chloroprene rubber, and a hydrogenated nitrile rubber (HNBR)], an ethylene-α-olefin elastomer (such as an ethylene-propylene copolymer (EPM) and an ethylene-propylene-diene terpolymer (EPDM)), a chlorosulfonated polyethylene rubber (CSM), an alkylated chlorosulfonated polyethylene rubber (ACSM), an epichlorohydrin rubber, an acrylic rubber, a silicone rubber, a urethane rubber, and a fluorine rubber. The rubber components may be carboxylated, such as a carboxylated SBR or a carboxylated NBR. These rubber components may be used alone or in combination of two or more thereof.

A particularly preferred rubber component is a hydrogenated nitrile rubber (HNBR), and a chloroprene rubber (CR) and an ethylene-propylene-diene terpolymer (EPDM) are also suitably used. A preferred rubber component, particularly in the application where the high load acts is a rubber having high thermal aging resistance, particularly a hydrogenated nitrile rubber (HNBR) which may be carboxylated (hereinafter, may be simply referred to as a hydrogenated nitrile rubber, including carboxylated hydrogenated nitrile rubber). In the rubber component, a proportion of the preferred rubber component is preferably 50 mass % or more (for example, about 80 mass % to 100 mass %), and particularly preferably 100 mass %. The hydrogenated nitrile rubber which may be carboxylated may be either a partially hydrogenated nitrile rubber or a fully hydrogenated nitrile rubber. A hydrogenation rate of the hydrogenated nitrile rubber which may be carboxylated may be selected from a range of about 50% to 100%, and may be 70% to 100%.

In the present application, the HNBR refers to a rubber in which while oil resistance, which is an advantage of a nitrile rubber in related art, is maintained, an unsaturated bond (carbon-carbon double bond) of the nitrile rubber in the related art is chemically hydrogenated in order to prevent aging of rubber elasticity due to a recombination reaction of sulfur during thermal aging, thereby making the recombination reaction during the thermal aging less likely to occur and improving heat resistance.

An iodine value (unit: mg/100 mg) of the HNBR is, for example, 5 to 60 (for example, 7 to 50), preferably 8 to 40 (for example, 8 to 35), and more preferably 10 to 30.

In the present application, the iodine value is an index indicating the amount of unsaturated bonds, and indicates that the larger the iodine value, the greater the amount of unsaturated bonds contained in a polymer molecular chain. The iodine value is determined by adding an excessive amount of iodine to a measurement sample to cause a complete reaction (reaction between the iodine and the unsaturated bonds), and quantifying the amount of remaining iodine by redox titration. When the iodine value of the HNBR is small, a crosslinking reaction between the HNBR is not sufficient, and rigidity of the crosslinked rubber is low, and thus the deformation resistance may be deteriorated during running of the belt. On the other hand, when the iodine value of the HNBR is large, the amount of unsaturated bonds becomes excessively large, and thermal degradation or oxidative degradation of the crosslinked rubber progresses, which may shorten a life of the belt.

The rubber component preferably contains at least a hydrogenated nitrile rubber which may be carboxylated. A proportion of the hydrogenated nitrile rubber may be 80 mass % to 100 mass %, preferably 90 mass % to 100 mass %, and more preferably 100 mass % in the rubber component.

The rubber component preferably contains a composite polymer or a polymer alloy containing a hydrogenated nitrile rubber and an unsaturated carboxylic acid metal salt (hereinafter, referred to as an "HNBR containing an unsaturated carboxylic acid metal salt"). In the present application, a composite polymer contained in the first rubber component is referred to as a first composite polymer, and a composite polymer contained in the second rubber component is referred to as a second composite polymer. The polymer can increase the elastic modulus (modulus) and the hardness of the tooth portion, prevent the deformation of the rubber, and prevent the growth of the crack.

The unsaturated carboxylic acid metal salt may be a compound in which an unsaturated carboxylic acid having one or more carboxy groups is ionically bonded to a metal.

Examples of the unsaturated carboxylic acid of the unsaturated carboxylic acid metal salt include monocarboxylic acids such as a (meth)acrylic acid and a crotonic acid, dicarboxylic acids such as a maleic acid, a fumaric acid, and an itaconic acid, and monoalkyl esters of these dicarboxylic acids. These unsaturated carboxylic acids may be used alone or in combination of two or more thereof. A preferred unsaturated carboxylic acid is a (meth)acrylic acid.

Examples of the metal of the unsaturated carboxylic acid metal salt include polyvalent metals, for example, elements in Group 2 of the periodic table (magnesium, calcium, and the like), elements in Group 4 of the periodic table (titanium, zirconium, and the like), and elements in Group 8 to Group 14 of the periodic table (for example, iron, cobalt, nickel, copper, zinc, aluminum, tin, and lead). These metals may be used alone or in combination of two or more thereof. Preferred metals are elements in Group 2 of the periodic table (such as magnesium), elements in Group 12 of the periodic table (such as zinc), and the like.

Preferred examples of the unsaturated carboxylic acid metal salt include zinc (meth)acrylate and magnesium (meth)acrylate. The unsaturated carboxylic acid metal salts may be used alone or in combination of two or more thereof.

A mass ratio of the hydrogenated nitrile rubber to the unsaturated carboxylic acid metal salt may be selected from a range (hydrogenated nitrile rubber/unsaturated carboxylic acid metal salt) of about 100/80 to 100/180, preferably 100/85 to 100/175, and more preferably 100/90 to 100/175. If a proportion of the unsaturated carboxylic acid metal salt is too small, an elastic modulus (modulus) and a hardness of the crosslinked rubber composition (or tooth portion) may decrease, whereas if the proportion is too large, processability and the bendability of the belt may be deteriorated.

The HNBR containing the unsaturated carboxylic acid metal salt may be a commercially available product. For example, a product (for example, trade name "Zeoforte (ZSC)" manufactured by Zeon Corporation) obtained by finely dispersing zinc methacrylate as an unsaturated carboxylic acid metal salt in the HNBR at a high degree may be used.

The HNBR containing an unsaturated carboxylic acid metal salt is preferably used as a mixture with a hydrogenated nitrile rubber (HNBR) containing no unsaturated carboxylic acid metal salt. The mass ratio of the hydrogenated nitrile rubber to the unsaturated carboxylic acid metal salt may be adjusted by mixing a commercially available HNBR containing an unsaturated carboxylic acid metal salt and a commercially available hydrogenated nitrile rubber. The elastic modulus (modulus) and the hardness may be adjusted by changing a mixing ratio of both.

A proportion of the HNBR containing an unsaturated carboxylic acid metal salt may be 10 mass % or more in the rubber component, and is preferably 30 mass % or more, more preferably 50 mass % or more, still more preferably 80 mass % or more, and most preferably 90 mass % or more, and may be 100 mass %. In particular, the proportion of the HNBR containing an unsaturated carboxylic acid metal salt is preferably 80 mass % or more (particularly 100 mass %) in the rubber component (first rubber component) in the first rubber layer, and is preferably 30 mass % or more (particularly 100 mass %) in the rubber component (second rubber component) in the second rubber layer. These proportion may be a proportion in the product "Zeoforte (ZSC)".

As another rubber component combined with the "HNBR containing an unsaturated carboxylic acid metal salt", at least one selected from the group consisting of HNBR, EPDM, and CR is preferred. A proportion of the other rubber component in the rubber component is, for example, 70 mass % or less, preferably 50 mass % or less, more preferably 30 mass % or less, and most preferably 10 mass % or less.

In order to ensure adhesion between layers, the first rubber layer and the second rubber layer preferably contain the same series or the same type of rubber component, more preferably the same type of rubber component, and still more preferably the same rubber component.

(B) Short Fibers

As described above, the first crosslinked rubber composition contains the first short fibers as the essential component, and the second crosslinked rubber composition forming the second rubber layer may also contain second short fibers.

Examples of the short fibers (first short fibers and second short fibers) include: synthetic fibers such as polyolefin fibers (polyethylene fibers, polypropylene fibers, and the like), polyamide fibers [aliphatic polyamide fibers (nylon fibers) such as polyamide 6 fibers, polyamide 66 fibers, polyamide 46 fibers, aramid fibers, and the like], polyester fibers [polyalkylene arylate fibers (for example, $C_{2-4}$ alkylene $C_{8-14}$ arylate fibers such as polyethylene terephthalate (PET) fibers, polytrimethylene terephthalate (PTT) fibers, polybutylene terephthalate (PBT) fibers, and polyethylene naphthalate (PEN) fibers]; fully aromatic polyester fibers such as polyarylate fibers and liquid crystal polyester fibers, and the like], vinylon fibers, polyvinyl alcohol fibers, and polyparaphenylene benzobisoxazole (PBO) fibers; natural fibers such as cotton, hemp, and wool; regenerated cellulose fibers such as rayon; cellulose ester fibers; and inorganic fibers such as carbon fibers and glass fibers. These short fibers may be used alone or in combination of two or more thereof. In particular, fibers having a large elastic modulus (modulus), such as polyamide fibers, PBO fibers, glass fibers, and carbon fibers, may be suitably used, polyamide fibers such as aliphatic polyamide fibers (nylon fibers) and aramid fibers, and PBO fibers are more preferred, and aliphatic polyamide fibers are most preferred.

An average fiber diameter of the short fibers is, for example, 1 μm to 100 μm (for example, 3 μm to 70 μm), preferably 5 μm to 50 μm (for example, 7 μm to 30 μm), and more preferably 10 μm to 25 μm (particularly 12 μm to 20 μm). An average fiber length of the short fibers is, for example, 0.3 mm to 10 mm (for example, 0.5 mm to 7 mm), and preferably 1 mm to 5 mm (particularly 2 mm to 4 mm). If the average fiber diameter of the short fibers is too small or the average fiber length is too long, the short fibers may not be uniformly dispersed, or it may be difficult to orient the short fibers in a predetermined direction, and if the average fiber diameter is too large or the average fiber length is too short, mechanical properties of each rubber layer may be deteriorated.

It is preferable that the short fibers are subjected to a common adhesion treatment (or surface treatment), and an adhesion component is attached to at least a part of the surface of the short fibers. Such an adhesion treatment improves adhesion between the short fibers and the rubber component, and can prevent occurrence of a minute crack starting from an interface between the short fibers and the rubber component. Examples of the adhesion treatment include a treatment using an adhesion component such as an epoxy compound (or an epoxy resin), a polyisocyanate, a silane coupling agent, and resorcin-formalin-latex (RFL).

In the first crosslinked rubber composition, as described above, the proportion of the first short fibers may be 5 parts by mass to 60 parts by mass (particularly 10 parts by mass to 60 parts by mass) with respect to 100 parts by mass of the first rubber component, and is preferably 8 parts by mass to 55 parts by mass (for example, 10 parts by mass to 50 parts by mass), more preferably 13 parts by mass to 40 parts by mass, still more preferably 15 parts by mass to 30 parts by mass, and most preferably 18 parts by mass to 25 parts by mass. If the proportion of the first short fibers is too small, the tooth chipping resistance is deteriorated, whereas if the proportion is too large, a compounding effect of the short fibers is reduced, and the mechanical properties of the first rubber layer are deteriorated.

The second crosslinked rubber composition may not contain the second short fibers, but from the viewpoint of improving the mechanical properties of the second rubber layer, the second short fibers are preferably contained.

A proportion of the second short fibers with respect to the second rubber component is preferably smaller than the proportion of the first short fibers with respect to the first rubber component in order to improve the tooth chipping resistance. The proportion of the second short fibers may be 10 parts by mass or less (0 part by mass to 10 parts by mass), and particularly 5 parts by mass or less (for example, 3 parts by mass or less) with respect to 100 parts by mass of the second rubber component, and is preferably 0.1 part by mass to 5 parts by mass (for example, 0.3 part by mass to 4 parts by mass), more preferably 0.5 part by mass to 3.5 parts by mass, still more preferably 1 part by mass to 3 parts by mass, and most preferably 1.5 parts by mass to 2.5 parts by mass. If the proportion of the second short fibers is too large, an elastic modulus (modulus) and a hardness of the second crosslinked rubber composition can be increased, but a minute crack is likely to occur at an interface between the second rubber component and the second short fibers, and the tooth chipping resistance may be deteriorated.

When the second crosslinked rubber composition contains the second short fibers, an orientation direction of the second short fibers is not particularly limited, but the second short fibers are preferably arranged in the belt longitudinal direction, similarly to the first short fibers. Further, when the second crosslinked rubber composition contains the second short fibers, the second short fibers are preferably oriented along the contour of the tooth portion on a side close to the tooth fabric and arranged such that the second short fibers are oriented substantially parallel to the tension member as the second short fibers approach the tension member.

(C) Filling Compounding Agent

The crosslinked rubber composition (first crosslinked rubber composition and second crosslinked rubber composition) may further contain a filling compounding agent (filler). Examples of the filling compounding agent (first filling compounding agent and second filling compounding agent) include a reinforcing inorganic filler and a non-reinforcing filler.

Examples of the reinforcing inorganic filler (first reinforcing inorganic filler and second reinforcing inorganic filler) include carbon black and silica. These reinforcing inorganic fillers may be used alone or in combination of two or more thereof. The reinforcing inorganic filler may be in a powder form.

An average particle diameter (average primary particle diameter) of the carbon black is, for example, 5 nm to 200 nm, preferably 10 nm to 150 nm, more preferably 20 nm to 100 nm, and still more preferably 30 nm to 80 nm. An iodine adsorption amount of the carbon black is, for example, 5 mg/g to 200 mg/g, preferably 10 mg/g to 150 mg/g, more preferably 15 mg/g to 100 mg/g, and still more preferably 20 mg/g to 80 mg/g.

Examples of the silica include dry silica, wet silica, and surface-treated silica. The silica can be classified into, for example, dry-method white carbon, wet-method white carbon, colloidal silica, and precipitated silica, depending on a production method. These types of silica may be used alone or in combination of two or more thereof. Among these types of silica, silica having a surface silanol group (anhydrous silicic acid, hydrated silicic acid) is preferred, and a hydrated silicic acid having a large number of surface silanol groups has a strong chemical bonding force with the rubber component.

An average particle diameter (average primary particle diameter) of the silica is, for example, 1 nm to 500 nm, preferably 3 nm to 300 nm, more preferably 5 nm to 100 nm, and still more preferably 10 nm to 50 nm.

A nitrogen adsorption specific surface area of the silica by a BET method is, for example, 50 $m^2/g$ to 400 $m^2/g$, preferably 100 $m^2/g$ to 300 $m^2/g$, and more preferably 150 $m^2/g$ to 200 $m^2/g$.

In the present application, an average particle diameter of the reinforcing inorganic filler can be calculated as an arithmetic average particle diameter of an appropriate number of samples (for example, 50 samples) by image analysis of an electron micrograph including a scanning electron micrograph.

A proportion of the reinforcing inorganic filler may be 10 parts by mass or less with respect to 100 parts by mass of the rubber component, and is preferably 5 parts by mass or less, more preferably 1 part by mass or less, and still more preferably 0 part by mass. When the reinforcing inorganic filler is used as necessary, the proportion of the reinforcing inorganic filler may be, for example, 0.1 part by mass to 8 parts by mass, preferably 0.5 part by mass to 5 parts by mass, and more preferably 1 part by mass to 3 parts by mass with respect to 100 parts by mass of the rubber component. If the proportion of the reinforcing inorganic filler is too large, heat generation of the rubber composition increases, and the heat resistance is deteriorated, and thus a crack or tooth chipping may occur due to thermal degradation.

Examples of the non-reinforcing filler (first non-reinforcing filler and second non-reinforcing filler) include polyvalent metal carbonates (such as a calcium carbonate and a magnesium carbonate), a polyvalent metal hydroxide (such as an aluminum hydroxide), a polyvalent metal sulfate (such as a barium sulfate), a silicate (such as a natural or synthetic silicate in which a part of silicon is substituted with polyvalent metal atoms, such as an aluminum silicate, a magnesium silicate, and an aluminum magnesium silicate; a mineral containing a silicate as a main component, such as clay containing an aluminum silicate; and a silicate mineral such as talc and mica containing a magnesium silicate), lithopone, and silica sand. These non-reinforcing fillers may be used alone or in combination of two or more thereof.

A preferred non-reinforcing filler is at least one selected from a calcium carbonate, a magnesium carbonate, an aluminum hydroxide, a barium sulfate, and a silicate [silicate such as an aluminum silicate, a magnesium silicate, and an aluminum magnesium silicate; a silicate mineral (such as talc, clay, or mica)]. Further, from the viewpoint that an effect of improving the processability of the belt and dispersibility of the compounding agent is increased and poor dispersion of the compounding agent is less likely to occur, the non-reinforcing filler preferably contains at least one selected from a calcium carbonate, a magnesium silicate or talc containing a magnesium silicate, and an aluminum silicate or clay containing an aluminum silicate, and particularly preferably contains a calcium carbonate. As the non-reinforcing filler, a powdery filler commercially available as a rubber filler can be used.

An average particle diameter (average primary particle diameter) of the non-reinforcing filler may be selected from a range of about, for example, 0.01 µm to 25 µm (for example, 0.2 µm to 20 µm), and preferably 0.5 µm to 17 µm (for example, 1 µm to 15 µm). The average particle diameter (average primary particle diameter) of the non-reinforcing filler may be, for example, 0.01 µm to 3 µm (for example, 0.02 µm to 2 µm), preferably 0.05 µm to 1.5 µm (particularly 0.1 µm to 1 µm), or may be relatively large. The average particle diameter (average primary particle diameter) of the non-reinforcing filler may be, for example, 0.2 µm to 5 µm (for example, 0.3 µm to 3 µm), and preferably 0.5 µm to 2.5 µm (particularly 1 µm to 2 µm). Depending on a type of the non-reinforcing filler, for example, a magnesium silicate or a mineral thereof, the non-reinforcing filler may be cracked or crushed in a process of kneading with the rubber component or the like. The average particle diameter of the non-reinforcing filler having crushability or friability may be an average particle diameter before kneading with the rubber component or the like. The non-reinforcing filler may usually have an average particle diameter (for example, 0.1 µm to 10 µm, preferably 0.5 µm to 5 µm, and more preferably 1 µm to 3 µm) in the above range in each crosslinked rubber composition.

In the present application, the average particle diameter of the non-reinforcing filler can be measured as a volume average particle diameter using a laser diffraction particle size distribution analyzer. An average particle diameter of a nanometer-sized filler can be calculated as an arithmetic average particle diameter of an appropriate number of samples (for example, 50 samples) by image analysis of an electron micrograph including a scanning electron micrograph.

A proportion of the non-reinforcing filler is, for example, 70 parts by mass or less, preferably 40 parts by mass or less, and more preferably 30 parts by mass or less with respect to 100 parts by mass of the rubber component. When the non-reinforcing filler is used as necessary, the proportion of the non-reinforcing filler may be, for example, 3 parts by mass to 70 parts by mass, preferably 5 parts by mass to 40 parts by mass, and more preferably 10 parts by mass to 30 parts by mass with respect to 100 parts by mass of the rubber component. If the proportion of the non-reinforcing filler is too large, the dispersibility of the compounding agent may be poor.

A proportion of the filling compounding agent is, for example, 3 parts by mass to 70 parts by mass, preferably 5 parts by mass to 50 parts by mass, more preferably 10 parts by mass to 40 parts by mass, and still more preferably 20 parts by mass to 30 parts by mass with respect to 100 parts by mass of the rubber component.

(D) Crosslinking Compounding Agent

The rubber composition contains a crosslinking agent (vulcanizing agent) for crosslinking the rubber component, and optionally contains a co-crosslinking agent, a crosslinking aid (vulcanization aid), a crosslinking accelerator (vulcanization accelerator), a crosslinking retardant (vulcanization retardant), and the like as necessary. Among these, the crosslinking compounding agent (first crosslinking compounding agent and second crosslinking compounding agent) preferably contains at least a crosslinking agent and a co-crosslinking agent (crosslinking aid), and a combination of a crosslinking agent and a co-crosslinking agent is particularly preferred.

As the crosslinking agent (first crosslinking agent and second crosslinking agent), common components can be used depending on a type of the rubber component, and examples thereof include an organic peroxide, a sulfur-based crosslinking agent, and a metal oxide.

Examples of the organic peroxide (first organic peroxide and second organic peroxide) include di-t-butyl peroxide, dicumyl peroxide, t-butylcumyl peroxide, 1,1-t-butylperoxy-3,3,5-trimethylcyclohexane, 1,3-bis(t-butylperoxyisopropyl)benzene, 2,5-dimethyl-2,5-di(t-butylperoxy)hexane, 2,5-dimethyl-2,5-di(t-butyl) peroxy) hexyne-3, 1,3-bis(t-butylperoxy-di-isopropyl)benzene, 2,5-di-methyl-2,5-di(benzoylperoxy)hexane, t-butylperoxybenzoate, and t-butylperoxy-2-ethylhexyl carbonate. These organic peroxides may be used alone or in combination of two or more thereof.

Examples of the sulfur-based crosslinking agent include powdered sulfur, precipitated sulfur, colloidal sulfur, insoluble sulfur, highly dispersible sulfur, and sulfur chloride (sulfur monochloride, sulfur dichloride, and the like). These sulfur-based crosslinking agents may be used alone or in combination of two or more thereof.

Examples of the metal oxide include a magnesium oxide, a zinc oxide, and a lead oxide. These metal oxides may be used alone or in combination of two or more thereof.

The crosslinking agent may be appropriately selected depending on the type of the rubber component, and an organic peroxide and a metal oxide are preferred, and an organic peroxide is particularly preferred. The crosslinking agent may be a combination of an organic oxide and a metal oxide.

A proportion of the crosslinking agent is, for example, 1 part by mass to 20 parts by mass, preferably 3 parts by mass to 15 parts by mass, and more preferably 5 parts by mass to 10 parts by mass with respect to 100 parts by mass of the rubber component. If the proportion of the crosslinking agent is too small, the elastic modulus (modulus) and the hardness of the rubber composition decrease, whereas if the proportion is too large, the bendability of the belt is deteriorated.

A proportion of the organic peroxide may be selected from a range of about 0.5 part by mass to 20 parts by mass (for example, 1 part by mass to 10 parts by mass) with respect to 100 parts by mass of the rubber component, and is usually 1 part by mass to 5 parts by mass (for example, 1.2 parts by mass to 4.5 parts by mass), preferably 1.5 parts by mass to 4 parts by mass, and more preferably 2 parts by mass to 3 parts by mass. In the first rubber layer, a proportion of the first organic peroxide is, for example, 1 part by mass to 20 parts by mass, preferably 1.5 parts by mass to 10 parts by mass, and more preferably 1.5 parts by mass to 4 parts by mass with respect to 100 parts by mass of the first rubber component. In the second rubber layer, a proportion of the second organic peroxide is, for example, 0.5 part by mass to 5 parts by mass, preferably 0.8 part by mass to 4 parts by mass, and more preferably 1 part by mass to 3 parts by mass with respect to 100 parts by mass of the second rubber component.

Examples of the co-crosslinking agent (crosslinking aid or co-vulcanization agent co-agent) include known crosslinking aids, for example, a poly functional (iso)cyanurate [for example, triallyl isocyanurate (TAIC), triallyl cyanurate (TAC)], a polydiene (for example, 1,2-polybutadiene), a metal salt of an unsaturated carboxylic acid [for example, a polyvalent metal salt of a (meth)acrylic acid such as zinc (meth)acrylate and magnesium (meth)acrylate], oximes (for example, quinone dioxime), guanidines (for example, diphenyl guanidine), a polyfunctional (meth)acrylate [for example, an alkanediol di(meth)acrylate such as ethylene glycol di(meth)acrylate and butanediol di(meth)acrylate, and an alkane polyol poly(meth)acrylate such as trimethylolpropane tri(meth)acrylate and pentaerythritol tetra(meth)acrylate], and bismaleimides (an aliphatic bismaleimide, for example, an alkylene bismaleimide such as N,N'-1,2-ethylene dimaleimide, N,N'-hexamethylene bismaleimide, and 1,6'-bismaleimido-(2,2,4-trimethyl)cyclohexane; an arene bismaleimide or aromatic bismaleimide, such as N,N'-m-phenylene dimaleimide, 4-methyl-1,3-phenylene dimaleimide, 4,4'-diphenylmethane dimaleimide, 2,2-bis[4-(4-maleimidophenoxy)phenyl]propane, 4,4'-diphenyl ether dimaleimide, 4,4'-diphenylsulfone dimaleimide, and 1,3-bis(3-maleimidophenoxy)benzene). These co-crosslinking agents may be used alone or in combination of two or more thereof. Among these co-crosslinking agents, a polyfunctional (iso)cyanurate, a polyfunctional (meth)acrylate, and bismaleimides (arene bismaleimide or aromatic bismaleimide such as N,N'-m-phenylene dimaleimide) are preferred, and bismaleimides are particularly preferred. The addition of the co-crosslinking agent (for example, bismaleimides) can increase a degree of crosslinking and increase the elastic modulus.

A proportion of the co-crosslinking agent (crosslinking aid) such as bismaleimides is, in terms of solid content, for example, 0.2 part by mass to 40 parts by mass, preferably 0.5 part by mass to 30 parts by mass, more preferably 0.8 part by mass to 20 parts by mass, and still more preferably 1 part by mass to 15 parts by mass with respect to 100 parts by mass of the rubber component. In the first rubber layer, a proportion of the co-crosslinking agent (first co-crosslinking agent) is, for example, 1 part by mass to 40 parts by mass, preferably 2 parts by mass to 30 parts by mass (for example, 5 parts by mass to 20 parts by mass), more preferably 2.5 parts by mass to 18 parts by mass (for example, 8 parts by mass to 15 parts by mass), still more preferably 3 parts by mass to 14 parts by mass (for example, 4 parts by mass to 12 parts by mass), and most preferably 6 parts by mass to 11 parts by mass (for example, 5 parts by mass to 7 parts by mass) with respect to 100 parts by mass of the first rubber component. In the second rubber layer, a proportion of the co-crosslinking agent (second co-crosslinking agent) may be selected from a range of about 0.2 part by mass to 25 parts by mass with respect to 100 parts by mass of the second rubber component, and is, for example, 0.3 part by mass to 20 parts by mass (for example, 0.5 part by mass to 10 parts by mass), preferably 0.5 part by mass to 7 parts by mass (for example, 0.5 part by mass to 6 parts by mass), more preferably 0.8 part by mass to 5 parts by mass, still more preferably 0.8 part by mass to 3 parts by mass, and most preferably 0.8 part by mass to 2 parts by mass. In particular, when the proportion of the first co-crosslinking agent in the first rubber component is adjusted to 3 parts by mass or more (particularly 5 parts by mass or more), the tooth chipping resistance of the toothed belt can be highly improved by an effect of the combination with the first short fibers oriented in the predetermined direction.

The proportion of the crosslinking compounding agent is, for example, 0.2 part by mass to 50 parts by mass, preferably 0.5 part by mass to 40 parts by mass, more preferably 1 part by mass to 30 parts by mass, and still more preferably 2 parts by mass to 20 parts by mass in terms of solid content with respect to 100 parts by mass of the rubber component. In the first rubber layer, the proportion of the crosslinking compounding agent (first crosslinking compounding agent) is, for example, 1 part by mass to 40 parts by mass, preferably 5 parts by mass to 20 parts by mass, and more preferably 10 parts by mass to 15 parts by mass with respect to 100 parts by mass of the first rubber component. In the second rubber layer, the proportion of the crosslinking compounding agent (second crosslinking compounding agent) is, for example, 0.3 part by mass to 25 parts by mass, preferably 0.5 part by mass to 10 parts by mass, and more preferably 1 part by mass to 5 parts by mass with respect to 100 parts by mass of the second rubber component.

(E) Other Compounding Agents

The crosslinked rubber composition may further contain a common additive used for the rubber composition of the toothed belt. Examples of the common additive include metal oxides (calcium oxide, barium oxide, iron oxide, copper oxide, titanium oxide, aluminum oxide, and the like), softeners (oils such as paraffin oil and naphthenic oil, and the like), processing agents or processing aids (stearic acid or metal salts thereof, wax, paraffin, fatty acid amide, and the like), plasticizers [aliphatic carboxylic acid plasticizers (adipic acid ester plasticizers, sebacic acid ester plasticizers, and the like), aromatic carboxylic acid ester plasticizers (phthalic acid ester plasticizers, trimellitic acid ester plasticizers, and the like), oxycarboxylic acid ester plasticizers, phosphoric acid ester plasticizers, ether plasticizers, ether ester plasticizers, and the like], anti-aging agent (antioxidants, thermal aging resisters, anti-flex-cracking agents, antiozonants, and the like), colorants, tackifiers, plasticizers, coupling agents (silane coupling agents and the like), stabilizers (ultraviolet absorbers, thermal stabilizers, and the like), flame retardants, and antistatic agents. The crosslinked rubber composition may optionally contain an adhesion improving agent (resorcin-formaldehyde co-condensate, amino resin, and the like) if necessary. These additives may be used alone or in combination of two or more thereof.
(Preferable Compounding Aspect of First Rubber Layer and Second Rubber Layer)

The elastic modulus (modulus) of each of the first rubber layer and the second rubber layer can be adjusted by changing a predetermined component that affects the elastic modulus of the rubber layer and a quantitative proportion thereof. For example, a content of at least one component selected from the short fibers, the filling compounding agent, the crosslinking compounding agent [crosslinking agent, co-crosslinking agent (bismaleimides and the like)] and the like may be adjusted to be increased in the first rubber layer than in the second rubber layer. In particular, in the toothed belt of the present invention, the first rubber layer contains a predetermined amount of the first short fibers as the essential component, and thus the elastic modulus can be easily adjusted by adjusting the proportion of the second short fibers of the second rubber layer. Further, by making the proportion of the second short fibers of the second rubber layer smaller than the proportion of the first short fibers of the first rubber layer, occurrence of a minute crack in the second rubber layer is also prevented, and thus the tooth chipping resistance can be improved. Further, by adjusting the content of the co-crosslinking agent (particularly bismaleimides) in addition to the proportion of the short fibers, the elastic moduli (tensile elastic moduli) of the first rubber layer and the second rubber layer can be suitably adjusted in a balanced manner, and both the rigidity (deformation resistance) of the tooth portion and the bendability (flexibility) which have a contradictory relationship can be achieved, and the tooth chipping resistance can be highly improved.

Further, in the toothed belt of the present invention, in order to have a large elastic modulus for obtaining the rigidity of the tooth portion that can withstand use under a condition in which a higher load acts, and to achieve both the rigidity (deformation resistance) of the tooth portion and the bendability (flexibility) which have a contradictory relationship, the following compounding is a suitable aspect.

In a suitable aspect, in the first rubber layer, the first rubber component may contain 80 mass % or more of HNBR containing an unsaturated carboxylic acid metal salt, and a proportion of the first short fibers may be 5 parts by mass to 60 parts by mass, a proportion of the first reinforcing inorganic filler may be 10 parts by mass or less, a proportion of bismaleimides as the first co-crosslinking agent may be 1 part by mass to 40 parts by mass, and a proportion of an organic peroxide as the first crosslinking agent may be 1 part by mass to 20 parts by mass with respect to 100 parts by mass of the first rubber component; and in the second rubber layer, the second rubber component may contain 30 mass % or more of HNBR containing an unsaturated carboxylic acid metal salt, and a proportion of the second short fibers may be 5 parts by mass or less, a proportion of the second reinforcing inorganic filler may be 10 parts by mass or less, a proportion of bismaleimides as the second co-crosslinking agent may be 0.2 part by mass to 25 parts by mass, and a proportion of an organic peroxide as the second crosslinking agent may be 0.5 part by mass to 5 parts by mass with respect to 100 parts by mass of the second rubber component.

(Tooth Fabric)

When the tooth portion includes the tooth fabric, a tooth fabric constituting the belt inner circumferential surface (surfaces of the tooth portion and the tooth bottom portion) may be made of, for example, a fabric such as a woven fabric, a knitted fabric, or a non-woven fabric. In common, the woven fabric (canvas) is often used, and the woven fabric is formed by weaving warps extending in the belt width direction and wefts extending in the belt circumferential direction. A weave structure of the woven fabric is not particularly limited as long as warps and wefts regularly intersect in vertical and horizontal directions, may be any of plain weave, twill weave (or diagonal weave), satin weave, and the like, and may be a weave structure in which these structures are combined. A preferred woven fabric has twill weave and satin weave structures.

Examples of fibers for forming wefts and warps of the tooth fabric include polyphenylene ether fibers, polyether ether ketone fibers, polyether sulfone fibers, and polyurethane fibers in addition to the same fibers as the short fibers. These fibers may be used alone or in combination of two or more thereof. Among these fibers, organic fibers are widely used, and cellulose fibers such as cotton and rayon, polyester fibers (PET fibers and the like), polyamide fibers (aliphatic polyamide fibers such as polyamide 66 fibers, aramid fibers, and the like), PBO fibers, fluororesin fibers [polytetrafluoroethylene (PTFE) fibers and the like], and the like are preferred. In addition, composite yarns of these fibers and stretchable elastic yarns (for example, a stretchable polyurethane elastic yarn such as spandex made of polyurethane, and a textured yarn subjected to stretch processing (for example, woolly processing and crimping processing)) are also preferred.

A form of each of the warp and the weft is not particularly limited, and may be a monofilament yarn which is a single long fiber, a multifilament yarn in which filaments (long fibers) are aligned or twisted, a spun yarn in which short fibers are twisted, or the like. The multifilament yarn or the spun yarn may be a twisted yarn or a blended yarn using a plurality of types of fibers. The weft preferably contains the stretchable elastic yarn, and the warp usually does not contain the elastic yarn from the viewpoint of weaving properties. In order to ensure stretchability of the tooth fabric in the belt circumferential direction, the weft including the elastic yarn extends in the belt circumferential direction, and the warp extends in the belt width direction.

An average diameter of fibers (or yarns) is, for example, 1 μm to 100 μm (for example, 3 μm to 50 μm), preferably 5 μm to 30 μm, and more preferably 7 μm to 25 μm. Regarding an average fiber diameter (thickness) of a yarn (twisted yarn), the weft may be, for example, about 100 dtex to 1000 dtex (particularly, 300 dtex to 700 dtex), and the warp may be, for example, about 50 dtex to 500 dtex (particularly, 100 dtex to 300 dtex). A weft density (threads/cm) may be, for example, about 5 to 50 (particularly about 10 to 30), and a warp density (threads/cm) may be, for example, about 10 to 300 (particularly about 20 to 100).

The woven fabric may have a multiple weave structure (such as a double weave structure), and in a weave structure including warps and wefts, at least some of the wefts may be made of fibers having a low friction coefficient (or low-friction fibers) such as fluororesin-containing fibers (such as composite yarns including fibers made of a fluororesin such as PTFE). For example, the warp may be made of a polyamide fiber such as nylon 66, a polyester fiber, or the like, and the weft may be made of a single fiber made of the fluororesin; a composite yarn of the fiber made of the fluororesin and a second fiber such as a polyamide fiber or a polyurethane fiber (elastic yarn); a composite yarn of the composite yarn and a second composite yarn made of a plurality of second fibers; or the like.

In this aspect, among the wefts, it is preferable to use a fluorine-based fiber (for example, a PTFE fiber) having a low friction coefficient as a weft located (exposed) on a surface side of the tooth fabric (side meshing with the toothed pulley) in order to reduce friction between the tooth fabric and the toothed pulley. On the other hand, by using a fiber other than the fluorine-based fiber for a weft located on a back surface side of the tooth fabric (side adhered to the first rubber layer), it is possible to increase an adhesion force between the tooth fabric and the rubber constituting the tooth portion. With the tooth fabric in this aspect, friction caused by meshing between the tooth fabric and the toothed pulley can be reduced, and noise generation can be prevented.

In addition, when the fluorine-based fiber is used, a low-melting-point fiber having a melting point that melts at a crosslinking (vulcanization) temperature of the tooth portion and the back portion, which are made of rubber as a base material, is preferably disposed around the fluorine-based fiber. Specifically, a form of a composite yarn containing the fluorine-based fiber includes a form in which the fluorine-based fiber and the low-melting-point fiber are twisted, or a form in which the fluorine-based fiber is covered with the low-melting-point fiber. Crosslinking (vulcanization) conditions of the tooth portion and the back portion are not particularly limited, and are generally a crosslinking (vulcanization) temperature of 100° C. to 200° C. and a crosslinking (vulcanization) time of about 1 minute to 5 hours.

In an aspect in which the low-melting-point fiber is disposed around the fluorine-based fiber, the low-melting-point fiber melt during crosslinking (vulcanization) of the tooth portion and the back portion, flows into the fibers constituting the tooth fabric, and then is cooled to the melting point or less, whereby the low-melting-point fiber is crystallized. Therefore, at the time of meshing with the toothed pulley or disengagement from the toothed pulley, the fluorine-based fiber is prevented from being cut and scattered due to impact or abrasion generated on a surface of the tooth fabric. When the weft of the above aspect is used as the tooth fabric of the toothed belt, the tooth portion and the back portion are protected for a longer period by the action, and thus it is possible to prevent the tooth chipping of the belt, and it is possible to achieve the long life during running with a high load.

An average thickness of the tooth fabric (tooth fabric in the toothed belt) is, for example, 0.1 mm to 2 mm, and preferably 0.2 mm to 1.5 mm. An average thickness of a tooth fabric (tooth fabric before forming) as a raw material is, for example, 0.5 mm to 3 mm, and preferably 0.75 mm to 2.5 mm.

In order to improve the adhesion with the first rubber layer, the fabric forming the tooth fabric may be subjected to an adhesion treatment. Examples of the adhesion treatment include a method in which the fabric is immersed in an RFL treatment liquid and then heated and dried; a method in which the fabric is treated with an epoxy compound or an isocyanate compound; a method in which a rubber composition is dissolved in an organic solvent to form a rubber cement, the fabric is immersed in the rubber cement, and then heated and dried, and a method in which these treatment methods are combined. These methods can be performed alone or in combination, and the processing order and the number of times of processing are not limited. For example, the fabric may be pretreated with an epoxy compound or an isocyanate compound, immersed in an RFL treatment liquid, and then heated and dried.

Further, for the purpose of improving the adhesion between the tooth fabric and the first rubber layer, an uncrosslinked rubber sheet obtained by rolling the rubber composition may be laminated on a surface of a back surface side (side adhered to the first rubber layer) of the fabric forming the tooth fabric. The rubber composition (third crosslinked rubber composition) can be appropriately selected from the crosslinked rubber compositions exemplified as the crosslinked rubber compositions for forming the first rubber layer and the second rubber layer, and may be a common adhesion rubber composition. The uncrosslinked rubber sheet made of the rubber composition may form the third rubber layer (adhesion rubber layer) interposed between the tooth fabric and the first rubber layer in the toothed belt. The fabric subjected to the above adhesion treatment is referred to as a tooth fabric precursor.

[Tooth Bottom Portion]

When the tooth portion includes the tooth fabric, the tooth fabric constitutes the surface of the tooth portion and also constitutes the surface on the tooth portion side of the back portion (surface of the tooth bottom portion).

When the tooth portion includes the tooth fabric, the first rubber layer and the second rubber layer may be interposed between the tooth fabric and the tension member in the back portion corresponding to the tooth bottom portion, but only the first rubber layer may be interposed, or the tooth fabric and the tension member may be in contact with each other without interposing the first rubber layer and the second rubber layer. Even when the first rubber layer is interposed or the first rubber layer and the second rubber layer are interposed in the back portion corresponding to the tooth bottom portion, a thickness of the first rubber layer and a thicknesses of the first rubber layer and the second rubber layer are formed thinner than the tooth portion in any case.

When the tooth portion does not include the tooth fabric, the back portion corresponding to the tooth bottom portion may be formed by the first rubber layer and the second rubber layer, or may be formed by the first rubber layer alone. In the back portion corresponding to the tooth bottom portion, the thickness of the first rubber layer and the thicknesses of the first rubber layer and the second rubber layer are formed thinner than the tooth portion in any case.

[Back Rubber Layer]

The tooth portion and the tooth bottom portion are formed on the inner circumferential surface of the back portion, and the back portion has the back rubber layer forming the belt outer circumferential surface on an outer circumferential surface side. Further, the back rubber layer is made of a crosslinked rubber composition (fourth crosslinked rubber composition). In the aspect shown in FIGS. 1 to 3, the other surface (back surface of the belt) on which the tooth portion is not formed is not covered with a fabric (woven fabric, knitted fabric, non-woven fabric, or the like), but may be covered as necessary. The fabric can be selected from the fabrics exemplified as the tooth fabric, including a preferred aspect.

(Fourth Crosslinked Rubber Composition)

A hardness of the fourth crosslinked rubber composition is preferably smaller than the hardness of the first crosslinked rubber composition and the second crosslinked rubber composition constituting the tooth portion, from the viewpoint of reducing the bending rigidity of the belt and ensuring bendability (winding property with respect to the pulley) and bending fatigue resistance.

Specifically, a rubber hardness Hs of the fourth crosslinked rubber composition is, for example, 80 degrees to 89 degrees in type A hardness. By adjusting the type A hardness of the back rubber layer to the above range, the bending rigidity of the back portion is lowered, and excellent bending fatigue resistance is obtained. If the type A hardness of the fourth crosslinked rubber composition is too small, a crack may occur in the back portion due to collision with foreign matter or the like, whereas if the type A hardness is too large, the bending fatigue resistance may be deteriorated, and a crack may occur in the back portion.

In the present application, the type A hardness is a hardness of a surface of the back rubber layer, and can be measured using a type A durometer in accordance with a spring type durometer hardness test specified in JIS K6253 (2012).

The fourth crosslinked rubber composition is not particularly limited as long as adhesion between the back rubber layer and the tooth portion is not impaired. The fourth crosslinked rubber composition can be selected from, for example, the crosslinked rubber compositions exemplified as the crosslinked rubber compositions of the first rubber layer and the second rubber layer, and can be appropriately adjusted such that the rubber hardness falls within the above range.

In the fourth crosslinked rubber composition, a rubber component (fourth rubber component) preferably contains the same series or the same type of rubber component as the second rubber layer (internal rubber layer), and more preferably the same type of rubber component, from the viewpoint of improving the adhesion between the back rubber layer and the tooth portion.

The fourth rubber component preferably contains HNBR containing an unsaturated carboxylic acid metal salt. A proportion of the HNBR containing an unsaturated carboxylic acid metal salt in the fourth rubber component may be 5 mass % or more, and is, for example, 5 mass % to 50 mass %, preferably 10 mass % to 30 mass %, and more preferably 15 mass % to 25 mass %. The fourth rubber component may be a combination of HNBR containing no unsaturated carboxylic acid metal salt and HNBR containing an unsaturated carboxylic acid metal salt.

The filling compounding agent may be a reinforcing inorganic filler (fourth reinforcing inorganic filler), and a combination of carbon black and silica is preferred. A proportion of the carbon black is, for example, 1 part by mass to 50 parts by mass, preferably 2 parts by mass to 30 parts by mass, and more preferably 3 parts by mass to 10 parts by mass with respect to 100 parts by mass of the silica. A proportion of the fourth reinforcing inorganic filler is, for example, 10 parts by mass to 100 parts by mass, preferably 20 parts by mass to 80 parts by mass, and more preferably 30 parts by mass to 50 parts by mass with respect to 100 parts by mass of the fourth rubber component.

A crosslinking agent (fourth crosslinking agent) may be a combination of an organic peroxide (fourth organic peroxide) and a metal oxide (fourth metal oxide). A proportion of the fourth organic peroxide is, for example, 0.5 part by mass to 5 parts by mass, preferably 0.8 part by mass to 4 parts by mass, and more preferably 1 part by mass to 3 parts by mass with respect to 100 parts by mass of the fourth rubber component. A proportion of the fourth metal oxide is, for example, 1 part by mass to 15 parts by mass, preferably 2 parts by mass to 10 parts by mass, and more preferably 3 parts by mass to 8 parts by mass with respect to 100 parts by mass of the fourth rubber component.

A co-crosslinking agent (fourth co-crosslinking agent) may be bismaleimides. A proportion of the fourth co-crosslinking agent is, for example, 0.2 part by mass to 10 parts by mass, preferably 0.5 part by mass to 5 parts by mass, and more preferably 1 part by mass to 3 parts by mass with respect to 100 parts by mass of the fourth rubber component.

The fourth crosslinked rubber composition may contain a plasticizer. The plasticizer can be selected from the plasticizers exemplified for the first rubber layer and the second rubber layer. The plasticizers may be used alone or in combination of two or more thereof. Among the plasticizers, an ether ester plasticizer is preferred.

A proportion of the plasticizer is, for example, 1 part by mass to 50 parts by mass, preferably 2 parts by mass to 30 parts by mass, more preferably 3 parts by mass to 20 parts by mass, and still more preferably 5 parts by mass to 15 parts by mass with respect to 100 parts by mass of the fourth rubber component.

An average thickness of the back rubber layer is, for example, 0.3 mm to 3 mm, and preferably 0.5 mm to 2 mm. An average thickness of the back portion (average thickness of the back portion at the tooth bottom portion) is, for example, 1 mm to 5 mm, and preferably 1.5 mm to 4 mm.

[Tension Member]

The tension member extending along the belt circumferential direction is embedded in the back portion on an inner circumferential side of the back rubber layer. The tension member acts as an tension body, and can improve running stability and strength of the toothed belt. Further, in the back portion, the tension member, which is a twisted cord extending along the belt circumferential direction, is usually embedded at predetermined intervals in the belt width direction, and the plurality of tension members may be arranged parallel to the longitudinal direction, but are usually embedded in a spiral shape from the viewpoint of the productivity. In the case of the spiral arrangement, an angle of the tension member with respect to the belt longitudinal direction may be, for example, 5° or less, and it is preferable that the angle is closer to 0° from the viewpoint of belt running performance.

More specifically, as shown in FIG. 1, the tension members may be embedded at predetermined intervals (or pitches) (or at equal intervals) from one end to the other end of the back portion in the belt width direction. It is sufficient that an interval (spinning pitch), which is a distance between centers of the adjacent tension members, is larger than a tension member diameter, and is, for example, 0.5 mm to 3.5 mm, preferably 0.8 mm to 3 mm, and more preferably 1 mm to 2.8 mm depending on the diameter of the tension member.

The tension member may be made of a twisted cord obtained by twisting a plurality of strands or multifilament yarns. Among these, a twisted cord of strands is preferred, and one strand may be formed by bundling filaments (long fibers). A thickness of the filament for forming the twisted cord, the number of bundled filaments, the number of strands, and a twist configuration of a twist method are not particularly limited.

The twisted cord for forming the tension member may be a single-twisted cord, a plied cord, or a Lang-twisted cord. When the tension member is a Lang-twisted cord in which a primary-twist direction and a secondary-twist direction are the same, the bending rigidity is smaller than that of a plied or single-twisted cord, and excellent bending fatigue resistance is obtained.

Fibers for forming the tension member are not particularly limited, and examples thereof include synthetic fibers such as polyester fibers (polyalkylene arylate fibers and polyparaphenylene naphthalate fibers), polybenzoxazole fibers, acrylic fibers, and polyamide fibers (aliphatic polyamide fibers, aramid fibers, and the like), and inorganic fibers such as glass fibers, carbon fibers, and metal fibers (steel fibers). These fibers may be used alone or in combination of two or more thereof. As the fibers for forming the tension member, synthetic fibers such as polyester fibers and polyamide fibers, inorganic fibers such as glass fibers and carbon fibers, and the like are widely used from the viewpoint of low elongation and high strength.

In particular, in the application where the high load acts, a multifilament yarn made of the carbon fibers is suitably used. As the carbon fibers, for example, trade name "Torayca" manufactured by Toray Industries, Inc., or the like is used.

The multifilament yarn made of the carbon fibers can be selected from multifilament yarns having different numbers of filaments, such as 6K and 12K. The 6K represents a multifilament yarn having 6000 filaments, and the 12K represents a multifilament yarn having 12000 filaments. A 6K multifilament yarn has a fineness of about 400 tex, and a 12K multifilament yarn has a fineness of about 800 tex.

When the fineness of the multifilament yarn made of the carbon fibers is more than 1000 tex, the bending fatigue resistance may be deteriorated. On the other hand, when the fineness of the multifilament yarn made of the carbon fibers is less than 300 tex, the material cost increases, and the number of primarily-twisted yarns required to produce the tension member having a sufficient tensile strength increases, resulting in an increase in workload.

In one embodiment of the toothed belt of the present invention, a carbon fiber cord (12K-1/0) obtained by single-twisting one 12K multifilament yarn (fineness of about 800 tex) is used as the tension member. Alternatively, a Lang-twisted carbon fiber cord (12K-1/4) obtained by primarily twisting one 12K multifilament yarn (fineness of about 800 tex) to prepare a primarily-twisted yarn, and secondarily twisting four prepared primarily-twisted yarns together may be used as the tension member. The "12K-1/0" indicates a twisted cord obtained by single-twisting one 12K multifilament yarn, and the "12K-1/4" indicates a twisted cord obtained by primarily twisting one 12K multifilament yarn to prepare a primarily-twisted yarn, and secondarily twisting four prepared primarily-twisted yarns together. Similarly, for example, "12K-1/3" indicates a twisted cord obtained by primarily twisting one 12K multifilament yarn to prepare a primarily-twisted yarn, and secondarily twisting three prepared primarily-twisted yarns together, and "12K-4/0" indicates a twisted cord obtained by single-twisting four 12K multifilament yarns together.

The tension member may be subjected to an adhesion treatment in order to improve adhesion with the fourth crosslinked rubber composition. A method of the adhesion treatment may be, for example, a method in which the twisted cord is immersed in a resorcin-formalin-latex treatment liquid (RFL treatment liquid) and then heated and dried to form a uniform adhesive layer on a surface of the twisted cord. The RFL treatment liquid is a mixture obtained by mixing an initial condensate of resorcin and formalin in a latex, and the latex may be, for example, chloroprene rubber, styrene-butadiene-vinylpyridine terpolymer (VP latex), nitrile rubber, or hydrogenated nitrile rubber. Further, the method of the adhesion treatment may be a method of performing pretreatment with an epoxy compound or an isocyanate compound and then performing a treatment with an RFL treatment liquid.

An average diameter (average wire diameter) of the twisted cord (or the tension member) is, for example, 0.2 mm to 2.5 mm, preferably 0.5 mm to 2.3 mm, and more preferably 0.7 mm to 2.2 mm. In particular, in the application where the high load acts, 0.8 mm to 2.1 mm is preferred. If the tension member diameter is too small, the elongation of the tension member increases, which may cause the tooth chipping (chipping of the tooth portion). If the tension member diameter is too large, tension member cutting may occur due to a deterioration in bending fatigue resistance of the tension member. In one embodiment of the present invention, the tension member diameter is adjusted to be 1.1 mm.

<Manufacturing Method for Toothed Belt>

The toothed belt of the present invention may be produced by, for example, the following method (preforming method).

[First Rubber Layer Precursor Preparation Step]

When the tooth portion includes the tooth fabric, first, the tooth fabric precursor forming the tooth fabric, and uncrosslinked rubber sheets forming a plurality of rubber layers, for example, a first rubber layer precursor which is an uncrosslinked rubber sheet for forming the first rubber layer (surface rubber layer), a second rubber layer precursor which is an uncrosslinked rubber sheet for forming the second rubber layer (internal rubber layer), and a back rubber layer precursor which is an unvulcanized rubber sheet for forming the back rubber layer are prepared.

In particular, the first rubber layer precursor is preferably subjected to the following first rubber layer precursor preparation step in order to orient the first short fibers in a predetermined direction.

In the first rubber layer precursor preparation step, the first short fibers can be oriented (arranged) in the predetermined direction in a process of preparing an uncrosslinked rubber sheet by rolling a rubber composition kneaded with a Banbury mixer or the like with a roll, a calendar, or the like. Specifically, examples of a method of orientating the first short fibers in the predetermined direction (one direction of a sheet surface) include a common method, for example, a method of passing rubber between a pair of calendar rolls provided with a predetermined gap, and rolling the rubber into a sheet to obtain a rolled sheet in which the first short fibers are orientated in a rolling direction.

When the second rubber layer and the back rubber layer contain short fibers (in particular, when the second rubber layer contains the second short fibers), the short fibers can be oriented by the same method.

[Pre-forming Step]

Next, the tooth fabric precursor forming the tooth fabric is wound around an outer circumferential surface of a cylindrical mold having a plurality of groove portions (recessed strips) corresponding to the tooth portions of the toothed belt. Subsequently, a laminate is formed by winding the first rubber precursor, which is an uncrosslinked rubber sheet for forming the first rubber layer (surface rubber layer), and the second rubber layer precursor, which is an uncrosslinked rubber sheet for forming the second rubber layer (internal rubber layer) on an outer periphery in order such that the orientation direction of the first short fibers of the first rubber precursor is the belt longitudinal direction. The laminate is pressurized from an outer circumferential side while being heated to a temperature (for example, about 70° C. to 90° C.) at which the rubber composition is softened by a predetermined device, and the rubber composition of the uncrosslinked rubber sheet and the tooth fabric precursor are pressed into the groove portions (recessed strips) of the cylindrical mold to form tooth portions, thereby obtaining a pre-formed body in a semi-crosslinked state. In the process of forming the tooth portions by pressing, a layer structure is formed in which the tooth fabric is stretched along the contour of the tooth portion and disposed on an outermost surface, the first rubber layer is disposed on an inner side along the contour of the tooth portion, the first short fibers are also arranged in a direction along the contour of the tooth portion while being arranged in the belt longitudinal direction, and the second rubber layer is further disposed on the inner side. When the tooth portion does not include the tooth fabric, the first rubber precursor is wound around the outer circumferential surface of the cylindrical mold instead of the tooth fabric precursor.

The method of obtaining the pre-formed body in the semi-crosslinked state may be a method in which a flat press mold (flat mold) having a plurality of groove portions (recessed strips) corresponding to the tooth portions is used instead of the cylindrical mold, and the rubber composition of the uncrosslinked rubber sheet and the tooth fabric precursor are pressed into the groove portions (recessed strips) of the flat mold using a hot press according to the above procedure to form the tooth portions. In this method, after the pre-formed body is removed from the flat mold, the pre-formed body is wound around and attached to a cylindrical mold having a plurality of groove portions (recessed strips) corresponding to the tooth portions (the tooth portions and the groove portions are fitted to each other), and the processing proceeds to the next step.

[Crosslinking Forming Step]

The twisted cord constituting the tension member is spirally wound around an outer circumferential surface of the obtained pre-formed body at a predetermined pitch (at a predetermined pitch in an axial direction of the cylindrical mold). Further, the back rubber layer precursor which is the uncrosslinked rubber sheet for forming the back rubber layer is wound around an outer circumferential side to form an uncrosslinked belt formed body (uncrosslinked laminate).

Subsequently, in a state in which the uncrosslinked belt formed body is disposed on an outer periphery of the cylindrical mold, a rubber jacket which is a vapor blocking material is further covered on an outside of the uncrosslinked belt formed body. Subsequently, the belt formed body covered with the jacket and the cylindrical mold are accommodated in a crosslinking forming device such as a vulcanization can. When the belt formed body is heated and pressurized inside the crosslinking forming device, a desired shape is formed, and respective constituent members are bonded and integrally cured by a crosslinking reaction of the uncrosslinked and semi-crosslinked rubber components contained in the belt formed body to form a sleeve-shaped crosslinked formed body (crosslinked belt sleeve).

[Cutting Step]

Finally, the crosslinked belt sleeve removed from the cylindrical mold is cut to a predetermined width, thereby obtaining a plurality of toothed belts.

EXAMPLES

Hereinafter, the present invention will be described in more detail based on Examples, but the present invention is not limited to these Examples.

[Rubber Composition]

TABLE 1

| Rubber composition | Rubber composition (parts by mass) |  |  |  |  |  |  |  |  |  |  |  |  |
|---|---|---|---|---|---|---|---|---|---|---|---|---|---|
|  | Tooth portion |  |  |  |  |  |  |  |  |  |  |  |  |
|  | R1 | R2 | R3 | R4 | R5 | R6 | R7 | R8 | R9 | R10 | R11 | R12 | R13 |
| HNBR | 10 | — | — | — | — | — | — | — | — | — | — | — | — |
| HNBR containing unsaturated carboxylic acid metal salt | 90 | 100 | 100 | 100 | 100 | 100 | 100 | 100 | 100 | 100 | 100 | 100 | 100 |
| Nylon short fiber | 2 | 2 | 2 | 2 | 2 | 2 | 2 | 20 | 20 | 20 | 20 | 20 | 20 |
| Stearic acid | 1 | 1 | 1 | 1 | 1 | 1 | 1 | 1 | 1 | 1 | 1 | 1 | 1 |
| Carbon black SRF | 2 | 2 | 2 | 2 | 2 | 2 | 2 | 2 | 2 | 2 | 2 | 2 | 2 |
| Calcium carbonate | 20 | 20 | 20 | 20 | 20 | 20 | 20 | 20 | 20 | 20 | 20 | 20 | 20 |
| Zinc oxide | 5 | 5 | 5 | 5 | 5 | 5 | 5 | 5 | 5 | 5 | 5 | 5 | 5 |
| Anti-aging agent | 2 | 2 | 2 | 2 | 2 | 2 | 2 | 2 | 2 | 2 | 2 | 2 | 2 |
| Organic peroxide | 2 | 2 | 2 | 2 | 2 | 2 | 2 | 2 | 2 | 2 | 2 | 2 | 2 |
| Co-crosslinking agent | 1 | 1 | 3 | 6 | 8 | 11 | 14 | 1 | 3 | 6 | 8 | 11 | 14 |
| Total | 135 | 135 | 137 | 140 | 142 | 145 | 148 | 153 | 155 | 158 | 160 | 163 | 166 |
| Hardness (type D) | 62 | 65 | 68 | 70 | 71 | 73 | 75 | 68 | 70 | 71 | 73 | 75 | 78 |
| Tensile strength (MPa) [grain parallel direction] | 25.8 | 32.4 | 34.6 | 37.8 | 40.4 | 44.1 | 43.5 | 60.3 | 67.7 | 76.1 | 62.5 | 65.0 | 63.6 |
| Tensile elastic modulus (MPa) [grain perpendicular direction] | 2.4 | 3.8 | 6.0 | 9.4 | 10.9 | 13.7 | 16.8 | 5.3 | 9.0 | 14.0 | 14.3 | 19.2 | 23.5 |

TABLE 2

| Rubber composition | Tooth portion | | | | | | | | | | | | | | | Back portion |
|---|---|---|---|---|---|---|---|---|---|---|---|---|---|---|---|---|
| | R14 | R15 | R10 | R16 | R17 | R18 | R19 | R20 | R21 | R22 | R23 | R24 | R25 | R26 | R27 | R28 |
| HNBR | — | — | — | — | — | — | — | — | — | — | — | — | — | — | — | 80 |
| HNBR containing unsaturated carboxylic acid metal salt | 100 | 100 | 100 | 100 | 100 | 100 | 100 | 100 | 100 | 100 | 100 | 100 | 100 | 100 | 100 | 20 |
| Nylon short fiber | 5 | 10 | 20 | 30 | 50 | 60 | 65 | 10 | 50 | — | — | — | — | 2 | 20 | — |
| Aramid short fiber 1 | — | — | — | — | — | — | — | — | — | 50 | 20 | — | — | — | — | — |
| Aramid short fiber 2 | — | — | — | — | — | — | — | — | — | — | — | 20 | — | — | — | — |
| PBO short fiber | — | — | — | — | — | — | — | — | — | — | — | — | 20 | — | — | — |
| Stearic acid | 1 | 1 | 1 | 1 | 1 | 1 | 1 | 1 | 1 | 1 | 1 | 1 | 1 | 1 | 1 | 1 |
| Carbon black SRF | 2 | 2 | 2 | 2 | 2 | 2 | 2 | 2 | 2 | 2 | 2 | 2 | 2 | — | — | 2 |
| Silica | — | — | — | — | — | — | — | — | — | — | — | — | — | — | — | 40 |
| Calcium carbonate | 20 | 20 | 20 | 20 | 20 | 20 | 20 | 20 | 20 | 20 | 20 | 20 | 20 | 20 | 20 | — |
| Zinc oxide | 5 | 5 | 5 | 5 | 5 | 5 | 5 | 5 | 5 | 5 | 5 | 5 | 5 | 5 | 5 | 2 |
| Anti-aging agent | 2 | 2 | 2 | 2 | 2 | 2 | 2 | 2 | 2 | 2 | 2 | 2 | 2 | 2 | 2 | 2 |
| Organic peroxide | 2 | 2 | 2 | 2 | 2 | 2 | 2 | 2 | 2 | 2 | 2 | 2 | 2 | 2 | 2 | 2 |
| Co-crosslinking agent | 6 | 6 | 6 | 6 | 6 | 6 | 6 | 1 | 1 | 1 | 6 | 6 | 6 | 1 | 6 | 2 |
| Plasticizer | — | — | — | — | — | — | — | — | — | — | — | — | — | — | — | 10 |
| Total | 143 | 148 | 158 | 168 | 188 | 198 | 203 | 143 | 183 | 183 | 158 | 158 | 158 | 133 | 156 | 161 |
| Hardness (type D) | 70 | 71 | 71 | 73 | 75 | 76 | — | 71 | 75 | 75 | 71 | 74 | 73 | 64 | 71 | 27 |
| Tensile strength (MPa) [grain parallel direction] | 45.0 | 57.4 | 76.1 | 62.7 | 61.3 | 62.0 | — | 50.5 | 60.4 | 71.0 | 76.1 | 68.2 | 89.1 | 32.0 | 75.6 | — |
| Tensile elastic modulus (MPa) [grain perpendicular direction] | 10.8 | 12.6 | 14.0 | 13.7 | 14.0 | 13.9 | — | 4.3 | 9.5 | 10.0 | 14.0 | 14.8 | 13.0 | 3.8 | 13.9 | — |

[Materials used for Rubber Composition]
HNBR: "Zetpol 2010" manufactured by Zeon Corporation, iodine value: 11 mg/100 mg
HNBR containing an unsaturated carboxylic acid metal salt: "Zeoforte ZSC2295CX" manufactured by Zeon Corporation; Base HNBR: unsaturated carboxylic acid metal salt (mass ratio)=100:110, iodine value of base HNBR: 28 mg/100 mg
Nylon short fibers: "Leona" manufactured by Asahi Kasei Corporation, polyamide 66, average fiber length: 3 mm, average fiber diameter: 27 μm
Aramid short fibers 1: "Conex" manufactured by Teijin Limited, average fiber length: 3 mm, average fiber diameter: 14 μm
Aramid short fibers 2: "Twaron (registered trademark)" manufactured by Teijin Limited, average fiber length: 3 mm, average fiber diameter: 12 μm
PBO short fibers: "Zylon" manufactured by Toyo Bo Co., Ltd., average fiber length: 3 mm, average fiber diameter: 12 μm
Stearic acid: "Stearic acid Tsubaki" manufactured by NOF Corporation
Carbon black SRF: "Seast S" manufactured by Tokai Carbon Co., Ltd., average particle diameter: 66 nm, iodine adsorption amount: 26 mg/g
Silica: "Ultrasil VN-3" manufactured by Evonik Degussa Japan Co., Ltd., specific surface area: 155 $m^2$/g to 195 $m^2$/g
Calcium carbonate: "Super #1500" manufactured by Maruo Calcium Co., Ltd, average particle diameter: 1.5 μm
Zinc oxide: "Zinc oxide second grade" manufactured by Sakai Chemical Industry Co., Ltd., average particle diameter: 0.55 μm
Anti-aging agent: p,p'-dioctyldiphenylamine. "Nonflex OD3" manufactured by Seiko Chemical Co., Ltd.
Organic peroxide: 1,3-bis(t-butylperoxyisopropyl)benzene, theoretical active oxygen content: 9.45%
Co-crosslinking agent: N,N'-m-phenylene dimaleimide, "Vulnoc PM" manufactured by Ouchi Shinko Chemical Industrial Co., Ltd.
Plasticizer: "Adeka Cizer RS 700" manufactured by ADEKA Corporation

[Tension Member]
A carbon fiber cord (12K-1/0, tensile elastic modulus: 230 GPa) obtained by single-twisting one 12K multifilament yarn ["Torayca T700SC-12000" manufactured by Toray Industries, Inc., single yarn fineness: 0.67 dtex, total fineness: 800 tex] was prepared and subjected to an adhesion treatment with an HNBR overcoat treatment agent to obtain a tension member having a tension member diameter of 1.1 mm.

[Tooth Fabric and Treatment of Tooth Fabric]
A woven fabric shown in Table 3 was immersed in an RFL treatment liquid and rubber cement to prepare a tooth fabric precursor. Specifically, in the RFL treatment, two types of RFL treatment liquids (RFL1 and RFL2) shown in Table 4 were used, and the immersion treatment was performed in the order of RFL1 and RFL2. Further, in the rubber cement treatment, two types of rubber cement (rubber cement 1 and rubber cement 2) shown in Table 5 were used, and the immersion treatment was performed in order of the rubber cement 1 and the rubber cement 2.

TABLE 3

| | Woven fabric structure<br>Tooth fabric structure |
|---|---|
| Weave structure | Weft double color double weave<br>Front 1/3 twill weave, back 2/2 twill weave |
| Warp | 66 nylon |
| Weft-1 | PTFE fiber *1<br>Polyester fiber *2<br>Urethane elastic yarn |
| Weft-2 | 66 nylon<br>urethane elastic yarn |

*1: PTFE fiber ["TOYOFLON 1330 dtex" manufactured by Toray Industries, Inc.]
*2: Polyester fiber ["CORNETTA" manufactured by Unitika Ltd., core-sheath type composite fiber having a core portion melting point of 256° C. and a sheath portion melting point of 160° C.]

TABLE 4

| RFL compounding (parts by mass) | | |
|---|---|---|
| Compounding | RFL1 | RFL2 |
| Hydrogenated nitrile rubber latex (40 mass %) | 100 | 100 |
| RF condensate dispersion liquid (20 mass %) | 50 | 25 |
| NaOH aqueous solution (10 mass %) | 0 | 2 |
| Maleimide compound aqueous dispersion (50 mass %) | 0 | 20 |
| Water | 110 | 110 |

TABLE 5

| Rubber cement compounding (parts by mass) | | |
|---|---|---|
| Compounding | Rubber cement 1 | Rubber cement 2 |
| Compounding for hydrogenated nitrile rubber cement rubber | 5 | 15 |
| Polymeric MDI | 5 | 0 |
| Methyl ethyl ketone | 90 | 85 |

[Preparation of Uncrosslinked Rubber Sheet]

An uncrosslinked rubber sheet for forming the tooth portion and the back portion (back rubber layer) was prepared by kneading each rubber composition having a composition shown in Tables 1 and 2 using a Banbury mixer, and rolling the obtained kneaded rubber to a predetermined thickness using a calendar roll. Short fibers contained in the uncrosslinked rubber sheet were oriented in a rolling direction. In the present application, the rubber compositions are denoted by R1 to R28, respectively.

[Hardness (Type D)]

The uncrosslinked rubber sheet was press-heated at a temperature of 165° C. for 30 minutes to prepare a crosslinked rubber sheet (100 mm×100 mm×2 mm thickness). A laminate obtained by laminating three crosslinked rubber sheets was used as a sample, and a hardness (type D) of the crosslinked rubber sheet was measured using a type D durometer in accordance with a spring type durometer hardness test specified in JIS K6253 (2012) (vulcanized rubber and thermoplastic rubber—hardness determining method—).

[Tensile Strength]

The uncrosslinked rubber sheet was press-heated at a temperature of 165° C. for 30 minutes to prepare a crosslinked rubber sheet (100 mm×100 mm×2 mm thickness), and a test piece punched into a dumbbell shape (No. 5 shape) was prepared in accordance with JIS K6251 (2017). In the sample containing the short fibers, a dumbbell-shaped test piece was collected such that an arrangement direction of the short fibers (grain parallel direction) was a tensile direction. A value (tensile strength T) obtained by dividing, by an initial cross-sectional area of the test piece, a maximum tensile force recorded when both ends of the test piece were gripped by a chuck (grip), and the test piece was pulled at a speed of 50 mm/min until the test piece was cut was defined as a tensile strength. A tensile strength of each rubber composition is shown in Tables 1 and 2.

[Tensile Elastic Modulus]

A dumbbell-shaped test piece (No. 5 shape) in accordance with JIS K6251 (2017) was prepared in the same manner as in the tensile strength. In the sample containing the short fibers, a dumbbell-shaped test piece was collected such that a direction perpendicular to an arrangement direction (grain perpendicular direction) of the short fibers was a tensile direction. A value (tensile stress at 2% elongation) obtained by dividing, by an initial cross-sectional area of the test piece, a tensile force when both ends of the test piece were gripped by a chuck (grip), the test piece was pulled at a speed of 50 mm/min, and a predetermined elongation (2%) was obtained was defined as a tensile elastic modulus (modulus). A tensile elastic modulus of each rubber composition is shown in Tables 1 and 2.

[Manufacture of Toothed Belt]

In Examples and Comparative Examples, as described below, a toothed belt having a total thickness of 5.6 mm, a tooth shape of G8M, a tooth height (including a tooth fabric) of 3.5 mm, a tooth pitch of 8 mm, the number of teeth of 140, a circumferential length of 1120 mm, and a width of 12 mm was produced using the pre-forming method described in the present embodiment.

Regarding the toothed belts produced in the respective Examples and Comparative Examples, a configuration (layer structure) of a tooth portion and a rubber composition used for each rubber layer are shown in Tables 7 to 11.

Comparative Example 1

A tooth fabric precursor for forming a tooth fabric, an uncrosslinked rubber sheet (R3, sheet thickness: 0.70 mm) for forming a first rubber layer, and an uncrosslinked rubber sheet (R2, sheet thickness: 1.00 mm) for forming a second rubber layer were laminated in this order on a press mold (flat mold) having a plurality of groove portions (recessed strips) corresponding to tooth portions of a toothed belt, and pressed under conditions of a temperature of 90° C. and a press pressure (surface pressure) of 20.2 MPa for 160 seconds to prepare a pre-formed body in a semi-crosslinked state.

Next, the pre-formed body was wound around and attached to a cylindrical mold (the tooth portions and the groove portions were fitted to each other), and twisted cords constituting a tension member were spirally spun on an outer circumferential surface of the pre-formed body (tension: 150 N/thread to 250 N/thread, spinning pitch: 1.25 mm, spinning speed: 1.5 m/s). Further, an uncrosslinked rubber sheet (R28, sheet thickness: 0.90 mm) for forming a back rubber layer was wound around an outer circumferential side to form an uncrosslinked belt formed body (uncrosslinked laminate). The uncrosslinked rubber sheet was wound such that an orientation direction of nylon short fibers contained in the sheet was a belt longitudinal direction.

Subsequently, crosslinking forming was performed for 40 minutes using a vulcanization can under conditions of a heating temperature of 179° C. and a vapor pressure of 0.83 MPa to prepare a crosslinked formed body (crosslinked belt sleeve).

Finally, the crosslinked belt sleeve removed from the cylindrical mold was cut to a width of 12 mm to obtain a toothed belt.

Comparative Examples 2 to 5

Toothed belts were produced in the same manner as in Comparative Example 1, except that R4 in Comparative Example 2, R5 in Comparative Example 3, R6 in Comparative Example 4, and R7 in Comparative Example 5 were used as the uncrosslinked rubber sheet for forming the first rubber layer.

Examples 1 to 6

Toothed belts were produced in the same manner as in Comparative Example 1, except that R8 in Example 1, R9 in Example 2, R10 in Example 3, R11 in Example 4, R12 in Example 5, and R13 in Example 6 were used as the uncrosslinked rubber sheet for forming the first rubber layer.

Comparative Example 6

A toothed belt was produced in the same manner as in Comparative Example 1, except that only one type of R2 (sheet thickness: 1.70 mm) was used as the uncrosslinked rubber sheet for forming the tooth portion.

Comparative Example 7

A toothed belt was produced in the same manner as in Comparative Example 1, except that only one type of R10 (sheet thickness: 1.70 mm) was used as the uncrosslinked rubber sheet for forming the tooth portion.

Comparative Example 8

A toothed belt was produced in the same manner as in Example 3, except that the uncrosslinked rubber sheet for forming the first rubber layer was made of R2 (sheet thickness: 0.85 mm) and the uncrosslinked rubber sheet for forming the second rubber layer was made of R10 (sheet thickness: 0.85 mm).

Example 7

A toothed belt was produced in the same manner as in Example 3, except that the thickness of the uncrosslinked rubber sheet for forming the first rubber layer was 0.20 mm and the thickness of the uncrosslinked rubber sheet for forming the second rubber layer was 1.50 mm.

Example 8

A toothed belt was produced in the same manner as in Example 3, except that the thickness of the uncrosslinked rubber sheet for forming the first rubber layer was 0.35 mm and the thickness of the uncrosslinked rubber sheet for forming the second rubber layer was 1.35 mm.

Example 9

A toothed belt was produced in the same manner as in Example 3, except that the thickness of the uncrosslinked rubber sheet for forming the first rubber layer was 1.00 mm and the thickness of the uncrosslinked rubber sheet for forming the second rubber layer was 0.70 mm.

Example 10

A toothed belt was produced in the same manner as in Example 3, except that the thickness of the uncrosslinked rubber sheet for forming the first rubber layer was 1.35 mm and the thickness of the uncrosslinked rubber sheet for forming the second rubber layer was 0.35 mm.

Examples 11 to 15

Toothed belts were produced in the same manner as in Example 3, except that R14 in Example 11, R15 in Example 12, R16 in Example 13, R17 in Example 14, and R18 in Example 15 were used as the uncrosslinked rubber sheet for forming the first rubber layer.

Examples 16 to 21

Toothed belts were produced in the same manner as in Example 3, except that R20 in Example 16, R21 in Example 17, R22 in Example 18, R23 in Example 19, R24 in Example 20, and R25 in Example 21 were used as the uncrosslinked rubber sheet for forming the first rubber layer.

Example 22

A toothed belt was produced in the same manner as in Example 3, except that the uncrosslinked rubber sheet for forming the first rubber layer was made of R14 (sheet thickness; 0.20 mm) and the uncrosslinked rubber sheet for forming the second rubber layer was made of R2 (sheet thickness: 1.50 mm).

Example 23

A toothed belt was produced in the same manner as in Example 3, except that the uncrosslinked rubber sheet for forming the first rubber layer was made of R17 (sheet thickness: 1.00 mm) and the uncrosslinked rubber sheet for forming the second rubber layer was made of R2 (sheet thickness: 0.70 mm).

Example 24

A toothed belt was produced in the same manner as in Example 3, except that the uncrosslinked rubber sheet for forming the first rubber layer was made of R17 (sheet thickness: 1.35 mm) and the uncrosslinked rubber sheet for forming the second rubber layer was made of R2 (sheet thickness: 0.35 mm).

Examples 25 to 27 and Comparative Example 9

Toothed belts were produced in the same manner as in Example 3, except that R1 in Example 25, R4 in Example 26, R5 in Example 27, and R7 in Comparative Example 9 were used as the uncrosslinked rubber sheet for forming the second rubber layer.

Examples 28 to 29

Toothed belts were produced in the same manner as in Example 25, except that R8 in Example 28 and R13 in Example 29 were used as the uncrosslinked rubber sheet for forming the first rubber layer.

Example 30 and Comparative Example 10

Toothed belts were produced in the same manner as in Comparative Example 9, except that R8 in Comparative Example 10 and R13 in Example 30 were used as the uncrosslinked rubber sheet for forming the first rubber layer.

Example 31

A toothed belt was produced in the same manner as in Example 3, except that the uncrosslinked rubber sheet for forming the first rubber layer was made of R27 and the uncrosslinked rubber sheet for forming the second rubber layer was made of R26.

Examples 32 and 33

In Examples 32 and 33, toothed belts were produced in the same manner as in Examples 3 and 14, respectively, except that the pre-formed body was produced without using the tooth fabric precursor for forming the tooth fabric. The toothed belts correspond to a toothed belt having a tooth height of 3.5 mm (excluding the tooth fabric), in which the tooth fabric is not provided on surfaces of the tooth portion and a tooth bottom portion of the belt.

[Bending Rigidity Test]

Regarding the toothed belt, in accordance with JIS K7106 (1995), a bending strength $E_r$ of the toothed belt was determined by a bending test using an Olsen type bending tester, and the determined $E_r$ was multiplied by a second moment of area $I_r$ of the toothed belt calculated by the following equation (1) to calculate a bending rigidity $E_rI_r$ of the toothed belt by the following equation (2). Here, a toothed belt test piece had a size of a length of 80 mm, a width of 12 mm, and a thickness of 2.1 mm, and a distance S between supports was 25.4 mm, and a moment M of a pendulum at a load scale of 100% was 0.343 N·m. The test was performed under conditions of a temperature of 23° C.±2° C. and a humidity of 65%±5%. The smaller the value of the bending rigidity, the better the bendability (flexibility). Determination criteria of the bending rigidity are shown below.

$$I_r = b \times h^3/12 \quad (1)$$

[in the equation, $I_r$: second moment of area (mm$^4$) of the test piece, b: width (mm) of the test piece, h: thickness (mm) of the test piece]

$$E_rI_r = [(S \times M)/300]) \times [N/(D \times 0.01745)] \quad (2)$$

[in the equation, $E_r$: bending strength (N/mm$^2$) of the test piece, $I_r$: second moment of area (mm$^4$) of the test piece, S: distance (mm) between supports, M: pendulum moment (N·m), D: bending angle (degree) (1 degree=π/180=0.01745 radian), N: reading (%) of a load scale plate corresponding to the bending angle (degree)]

(Determination Criteria of Bending Rigidity)
   a: bending rigidity of less than 700 MPa (acceptable)
   b: bending rigidity of 700) MPa or more and less than 800 MPa (acceptable)
   c: bending rigidity of 800 MPa or more (unacceptable)

[Tooth Rigidity Test]

Figure 6:
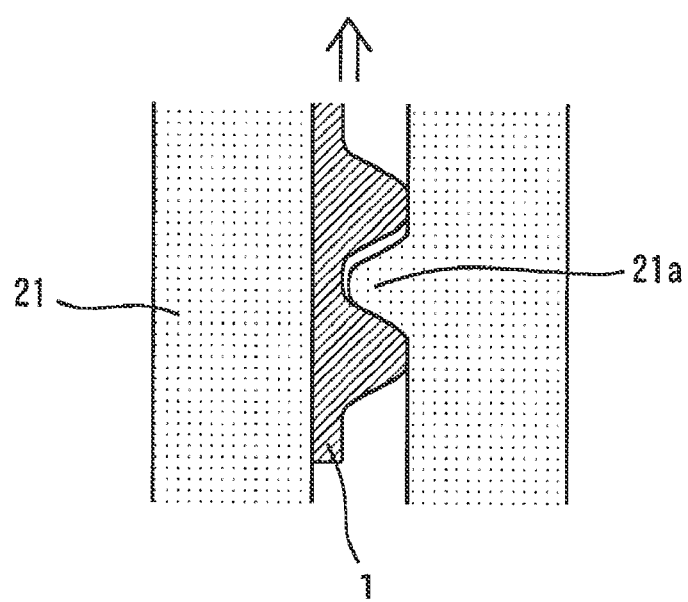
FIG. 6 is a schematic view illustrating a measurement method of a tooth rigidity test in Examples.
Figure 7:
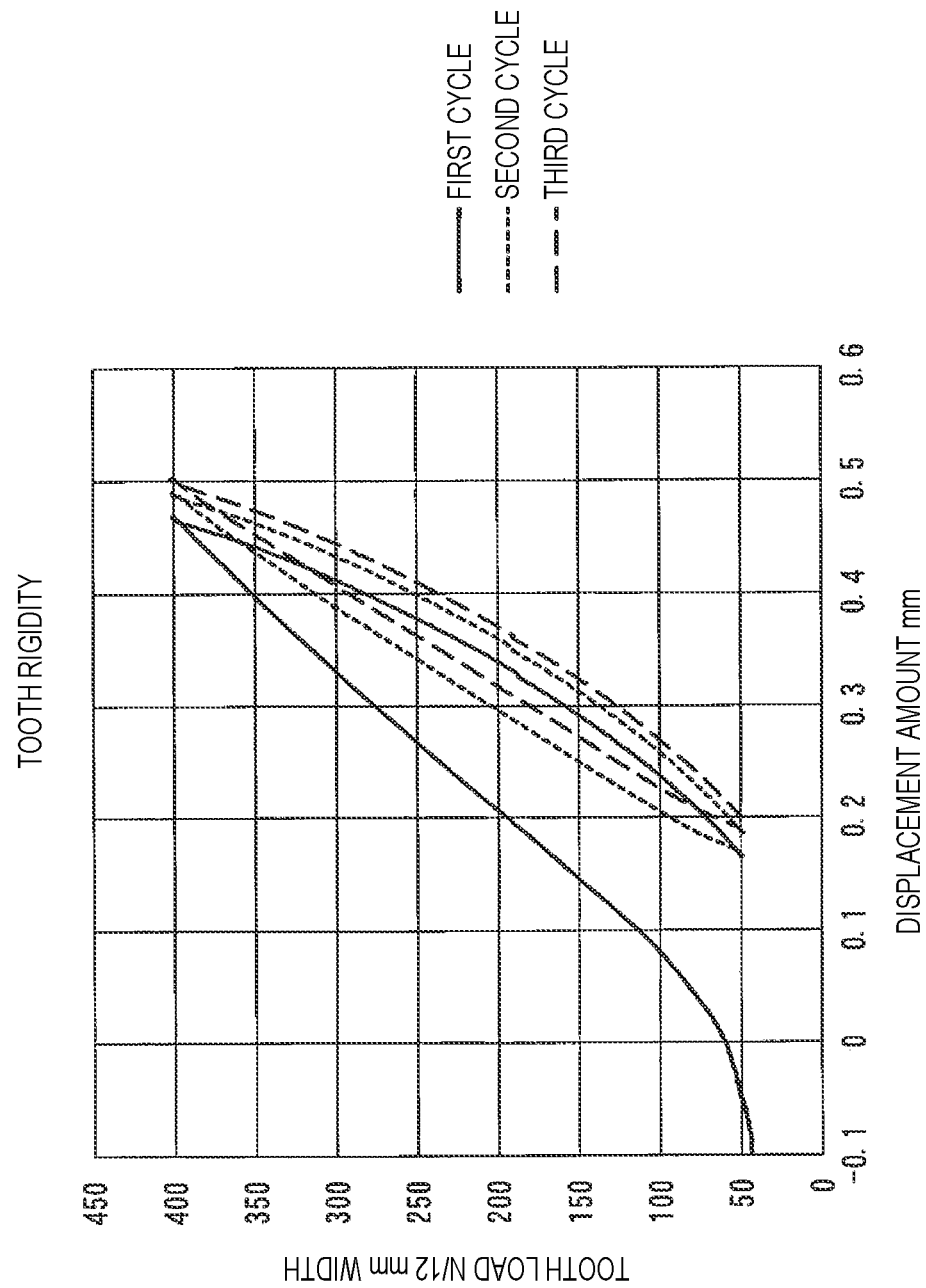
FIG. 7 is a graph showing an example of measurement data illustrating the measurement method of the tooth rigidity test in Examples.

As shown in FIG. 6, in a state in which the tooth portion of the toothed belt 1 was hooked on a protrusion 21a of a tooth shearing jig (rigid body assumed to be a tooth shape of a toothed pulley) 21 and one tooth was pressed at a constant pressure (tightening torque of 0.98 cNm/1 mm width), a tooth load with respect to a displacement when the toothed belt 1 was pulled at a speed of 1 mm/min by an autograph was defined and evaluated as a rigidity of the tooth portion (tooth rigidity). A value of the tooth load with respect to the displacement was determined by linear approximation of a section of a tooth load of 50 N/12 mm width to 400 N/12 mm width as shown in FIG. 7 using the third cycle in which a numerical value was stable. The larger the value of the tooth rigidity, the better the rigidity (deformation resistance) of the tooth portion. Determination criteria of the tooth rigidity are shown below.

(Determination Criteria of Tooth Rigidity)
   a: tooth rigidity of 1300 N/mm or more (acceptable)
   b: tooth rigidity of 1100 N/mm or more and less than 1300 N/mm (acceptable)
   c: tooth rigidity of less than 1100 N/mm (unacceptable)

[Jumping Test]

Using a biaxial torque measuring tester, a toothed belt was wound between a driving pulley (the number of teeth: 22) and a driven pulley (the number of teeth: 22), and a distance between axes of the pulleys was adjusted such that a belt tension was 230 N. Then, while the driving pulley was rotated at 1,800 rpm to run the belt, a load on the driven pulley was continuously increased, and a load torque applied to the driving pulley when jumping (tooth skipping) occurred was measured as a jumping torque. A numerical value of the jumping torque is used as an index of a jumping property, and it can be said that the larger the jumping torque value, the better the toothed belt in which the tooth skipping is less likely to occur.

Regarding the jumping torque value, a jumping torque value (112 N·m) of Comparative Example 2 in which a proportion of short fibers contained in the first rubber layer is small (2 parts by mass) and a durability running property is the best in Comparative Examples is regarded as 1.00, and a jumping torque value of each of Examples and Comparative Examples is shown in terms of relative value. When the value is 1.00 or less, a reinforcing effect on the toothed belt of Comparative Example 2 is not exhibited, and when the value exceeds 1.00, the rigidity (deformation resistance) of the tooth portion is improved by the reinforcing effect, and it can be said that the reinforcing effect is more highly exhibited as the value is larger.

(Determination Criteria of Jumping Test)
   a: jumping torque of exceeding 1.00 (acceptable)
   b: jumping torque of 1.00 (acceptable)
   c: jumping torque of 0.95 or more and less than 1.00 (acceptable)
   d: jumping torque of less than 0.95 (unacceptable)

[Durability Running Test]

A toothed belt was attached to a biaxial running tester including a driving pulley (the number of teeth: 22) and a driven pulley (the number of teeth: 22), and a running time until a failure (chipping of tooth portion) occurred in the toothed belt was measured as a running life. An attachment tension of the toothed belt was 230 N, a rotation speed of the driving pulley was 1800 rpm, a load of the driven pulley was 9.0 kW, and an ambient temperature was 25° C. (room temperature).

Regarding the running time until failure (hereinafter, referred to as a running time), a running time (159 hours) of Comparative Example 2 in which the proportion of the short fibers contained in the first rubber layer is small (2 parts by mass) and the durability running property is the best in Comparative Examples is regarded as 1.00, and a running time of each of Examples and Comparative Examples is shown in terms of relative value. When the value is 1.00 or less, a reinforcing effect on the toothed belt of Comparative Example 2 is not exhibited, and when the value exceeds 1.00, the durability running property is improved by the reinforcing effect, and it can be said that the reinforcing effect is more highly exhibited as the value is larger.

(Determination Criteria of Durability Running Test)
- a: running time until failure of 1.25 or more (reinforcing effect present)
- b: running time until failure of 1.10 or more and less than 1.25 (reinforcing effect present)
- c: running time until failure of exceeding 1.00 and less than 1.10 (reinforcing effect present)
- d: running time until failure of 1.00 or less (reinforcing effect absent)

(Comprehensive Determination)

In consideration of a level of the reinforcing effect in terms of both the jumping torque and the durability running property with respect to Comparative Example 2 as a reference, comprehensive evaluation was performed according to determination criteria shown in Table 6.

TABLE 6

| Comprehensive determination | | Determination of durability running test | Determination of jumping test |
|---|---|---|---|
| Rank A | Acceptable | a | a |
| Rank B | Acceptable | a | b |
| | | b | a |
| | | b | b |
| Rank C | Acceptable | a | c |
| | | b | c |
| | | c | a |
| | | c | b |
| | | c | c |
| Rank D | Unacceptable | a | d |
| | | b | d |
| | | c | d |
| | | d | a |
| | | d | b |
| | | d | c |
| | | d | d |

Test results of the toothed belts of Examples and Comparative Examples are shown in Tables 7 to 11. Further, FIG. 8 shows cross-sectional views of the respective tooth portions of the toothed belts in Examples 3, 8, and 9 and Comparative Examples 6 to 8.

TABLE 7

| | | Comparative Example | | | | |
|---|---|---|---|---|---|---|
| | | 1 | 2 | 3 | 4 | 5 |
| Structure of tooth portion | | Two layer | | | | |
| Proportion of area occupied by first rubber layer with respect to all rubber layers constituting tooth portion | | 40% | | | | |
| Rubber composition | First rubber layer | R3 | R4 | R5 | R6 | R7 |
| | Second rubber layer | R2 | R2 | R2 | R2 | R2 |
| Tensile strength (MPa) [grain parallel direction] | First rubber layer | 34.6 | 37.8 | 40.4 | 44.1 | 43.5 |
| | Second rubber layer | 32.4 | 32.4 | 32.4 | 32.4 | 32.4 |
| | Ratio | 4.0 | 1.2 | 1.3 | 1.4 | 1.5 |
| Tensile elastic modulus (MPa) [grain perpendicular direction] | First rubber layer | 6.0 | 9.4 | 10.9 | 13.7 | 16.8 |
| | Second rubber layer | 3.8 | 3.8 | 3.8 | 3.8 | 3.8 |
| | Ratio | 1.6 | 2.5 | 2.9 | 3.6 | 4.4 |
| Hardness (type D) | First rubber layer | 68 | 70 | 71 | 73 | 75 |
| | Second rubber layer | 65 | 65 | 65 | 65 | 65 |
| Bending rigidity (MPa) | | 602 | 652 | 660 | 676 | 724 |
| Determination | | a | a | a | a | b |
| Tooth rigidity (N/mm) | | 1185 | 1362 | 1410 | 1454 | 1527 |
| Determination | | b | a | a | a | a |
| Jumping torque (relative value) | | 0.95 | 1.00 | 1.03 | 1.06 | 1.07 |
| Determination | | c | b | a | a | a |
| Durability running (relative value) | | 0.53 | 1.00 | 0.80 | 0.86 | 0.69 |
| Determination | | d | d | d | d | d |
| Comprehensive determination | | D | D | D | D | D |

| | | Example | | | | | | Comparative Example | | |
|---|---|---|---|---|---|---|---|---|---|---|
| | | 1 | 2 | 3 | 4 | 5 | 6 | 6 | 7 | 8 |
| Structure of tooth portion | | Two layer | | | | | | One layer | One layer | Two layer |
| Proportion of area occupied by first rubber layer with respect to all rubber layers constituting tooth portion | | 40% | | | | | | — | — | 50% |
| Rubber composition | First rubber layer | R8 | R9 | R10 | R11 | R12 | R13 | R2 | R10 | R2 |
| | Second rubber layer | R2 | R2 | R2 | R2 | R2 | R2 | | | R10 |
| Tensile strength (MPa) [grain parallel direction] | First rubber layer | 60.3 | 67.7 | 76.1 | 62.5 | 65.0 | 63.6 | 32.4 | 76.1 | 32.4 |
| | Second rubber layer | 32.4 | 32.4 | 32.4 | 32.4 | 32.4 | 32.4 | | | 76.1 |
| | Ratio | 1.9 | 2.1 | 2.4 | 1.9 | 2.0 | 2.0 | — | — | 0.43 |

TABLE 7-continued

| | | | | | | | | | | |
|---|---|---|---|---|---|---|---|---|---|---|
| Tensile elastic modulus (MPa) [grain perpendicular direction] | First rubber layer | 5.3 | 9.0 | 14.0 | 14.3 | 19.2 | 23.5 | 3.8 | 14.0 | 3.8 |
| | Second rubber layer | 3.8 | 3.8 | 3.8 | 3.8 | 3.8 | 3.8 | | | 14.0 |
| | Ratio | 1.4 | 2.4 | 3.7 | 3.8 | 5.1 | 6.2 | — | — | 0.27 |
| Hardness (type D) | First rubber layer | 68 | 70 | 71 | 73 | 75 | 78 | 65 | 71 | 65 |
| | Second rubber layer | 65 | 65 | 65 | 65 | 65 | 65 | | | 71 |
| Bending rigidity (MPa) | | 610 | 662 | 671 | 680 | 676 | 670 | 553 | 825 | 820 |
| Determination | | a | a | a | a | a | a | a | c | c |
| Tooth rigidity (N/mm) | | 1280 | 1344 | 1442 | 1510 | 1600 | 1695 | 1092 | 1750 | 1275 |
| Determination | | b | a | a | a | a | a | a | a | b |
| Jumping torque (relative value) | | 0.97 | 1.05 | 1.11 | 1.07 | 1.13 | 1.18 | 0.90 | 1.35 | 1.07 |
| Determination | | c | a | a | a | a | a | d | a | a |
| Durability running (relative value) | | 1.43 | 1.64 | 2.08 | 1.50 | 1.55 | 1.54 | 0.33 | 0.43 | 0.75 |
| Determination | | a | a | a | a | a | a | d | d | d |
| Comprehensive determination | | C | A | A | A | A | A | D | D | D |

TABLE 8

| | | Example | | | | |
|---|---|---|---|---|---|---|
| | | 7 | 8 | 3 | 9 | 10 |
| Structure of tooth portion | | Two layer | Two layer | Two layer | Two layer | Two layer |
| Proportion of area occupied by first rubber layer with respect to all rubber layers constituting tooth portion | | 10% | 20% | 40% | 60% | 80% |
| Rubber composition | First rubber layer | | | R10 | | |
| | Second rubber layer | | | R2 | | |
| Tensile strength (MPa) [grain parallel direction] | First rubber layer | | | 76.1 | | |
| | Second rubber layer | | | 32.4 | | |
| | Ratio | | | 2.4 | | |
| Tensile elastic modulus (MPa) [grain perpendicular direction] | First rubber layer | | | 14.0 | | |
| | Second rubber layer | | | 3.8 | | |
| | Ratio | | | 3.7 | | |
| Hardness (type D) | First rubber layer | | | 71 | | |
| | Second rubber layer | | | 65 | | |
| Bending rigidity (MPa) | | 601 | 633 | 671 | 692 | 743 |
| Determination | | a | a | a | a | b |
| Tooth rigidity (N/mm) | | 1275 | 1347 | 1442 | 1527 | 1561 |
| Determination | | b | a | a | a | a |
| Jumping torque (relative value) | | 1.00 | 1.10 | 1.11 | 1.26 | 1.31 |
| Determination | | b | a | a | a | a |
| Durability running (relative value) | | 1.41 | 1.82 | 2.08 | 1.69 | 1.07 |
| Determination | | a | a | a | a | c |
| Comprehensive determination | | B | A | A | A | C |

TABLE 9

| | | Example | | | | | |
|---|---|---|---|---|---|---|---|
| | | 11 | 12 | 3 | 13 | 14 | 15 |
| Structure of tooth portion | | Two layer | | | | | |
| Proportion of area occupied by first rubber layer with respect to all rubber layers constituting tooth portion | | 40% | | | | | |
| Rubber composition | First rubber layer | R14 | R15 | R10 | R16 | R17 | R18 |
| | Second rubber layer | R2 | R2 | R2 | R2 | R2 | R2 |
| Tensile strength (MPa) [grain parallel direction] | First rubber layer | 45.0 | 57.4 | 76.1 | 62.7 | 61.3 | 62.0 |
| | Second rubber layer | 32.4 | 32.4 | 32.4 | 32.4 | 32.4 | 32.4 |
| | Ratio | 1.4 | 1.8 | 2.4 | 1.9 | 1.9 | 1.9 |
| Tensile elastic modulus (MPa) [grain perpendicular direction] | First rubber layer | 10.8 | 12.6 | 14.0 | 13.7 | 14.0 | 13.9 |
| | Second rubber layer | 3.8 | 3.8 | 3.8 | 3.8 | 3.8 | 3.8 |
| | Ratio | 2.8 | 3.3 | 3.7 | 3.6 | 3.7 | 3.7 |
| Hardness (type D) | First rubber layer | 70 | 71 | 71 | 73 | 75 | 76 |
| | Second rubber layer | 65 | 65 | 65 | 65 | 65 | 65 |
| Bending rigidity (MPa) | | 648 | 662 | 671 | 687 | 706 | 713 |
| Determination | | a | a | a | a | b | b |

TABLE 9-continued

| | | | | | | |
|---|---|---|---|---|---|---|
| Tooth rigidity (N/mm) | 1271 | 1367 | 1442 | 1430 | 1432 | 1425 |
| Determination | b | a | a | a | a | a |
| Jumping torque (relative value) | 1.03 | 1.05 | 1.11 | 1.07 | 1.07 | 1.06 |
| Determination | a | a | a | a | a | a |
| Durability running (relative value) | 1.24 | 1.86 | 2.08 | 1.30 | 1.25 | 1.21 |
| Determination | b | a | a | a | a | b |
| Comprehensive determination | B | A | A | A | A | B |

| | | Example | | | | | |
|---|---|---|---|---|---|---|---|
| | | 16 | 17 | 18 | 19 | 20 | 21 |
| Structure of tooth portion | | Two layer | | | | | |
| Proportion of area occupied by first rubber layer with respect to all rubber layers constituting tooth portion | | 40% | | | | | |
| Rubber composition | First rubber layer | R20 | R21 | R22 | R23 | R24 | R25 |
| | Second rubber layer | R2 | R2 | R2 | R2 | R2 | R2 |
| Tensile strength (MPa) [grain parallel direction] | First rubber layer | 50.5 | 60.4 | 71.0 | 76.1 | 68.2 | 89.1 |
| | Second rubber layer | 32.4 | 32.4 | 32.4 | 32.4 | 32.4 | 32.4 |
| | Ratio | 1.6 | 1.9 | 2.2 | 2.4 | 2.1 | 2.8 |
| Tensile elastic modulus (MPa) [grain perpendicular direction] | First rubber layer | 4.3 | 9.5 | 10.0 | 14.0 | 14.8 | 13.0 |
| | Second rubber layer | 3.8 | 3.8 | 3.8 | 3.8 | 3.8 | 3.8 |
| | Ratio | 1.1 | 2.5 | 2.6 | 3.7 | 3.9 | 3.4 |
| Hardness (type D) | First rubber layer | 71 | 75 | 75 | 71 | 74 | 73 |
| | Second rubber layer | 65 | 65 | 65 | 65 | 65 | 65 |
| Bending rigidity (MPa) | | 600 | 680 | 679 | 673 | 675 | 680 |
| Determination | | a | a | a | a | a | a |
| Tooth rigidity (N/mm) | | 1198 | 1285 | 1298 | 1458 | 1406 | 1483 |
| Determination | | b | b | b | a | a | a |
| Jumping torque (relative value) | | 0.95 | 1.00 | 1.00 | 1.12 | 1.15 | 1.12 |
| Determination | | c | b | b | a | a | a |
| Durability running (relative value) | | 1.24 | 1.30 | 1.51 | 2.11 | 1.39 | 1.85 |
| Determination | | b | a | a | a | a | a |
| Comprehensive determination | | C | B | B | A | A | A |

TABLE 10

| | | Example | | |
|---|---|---|---|---|
| | | 22 | 23 | 24 |
| Structure of tooth portion | | Two layer | | |
| Proportion of area occupied by first rubber layer with respect to all rubber layers constituting tooth portion | | 10% | 60% | 80% |
| Rubber composition | First rubber layer | R14 | R17 | R17 |
| | Second rubber layer | R2 | R2 | R2 |
| Tensile strength (MPa) [grain parallel direction] | First rubber layer | 45.0 | 61.3 | 61.3 |
| | Second rubber layer | 32.4 | 32.4 | 32.4 |
| | Ratio | 1.4 | 1.9 | 1.9 |
| Tensile elastic modulus (MPa) [grain perpendicular direction] | First rubber layer | 10.8 | 14.0 | 14.0 |
| | Second rubber layer | 3.8 | 3.8 | 3.8 |
| | Ratio | 2.8 | 3.7 | 3.7 |
| Hardness (type D) | First rubber layer | 70 | 75 | 75 |
| | Second rubber layer | 65 | 65 | 65 |
| Bending rigidity (MPa) | | 568 | 723 | 760 |
| Determination | | a | b | b |
| Tooth rigidity (N/mm) | | 1220 | 1542 | 1597 |
| Determination | | b | a | a |
| Jumping torque (relative value) | | 1.00 | 1.28 | 1.35 |
| Determination | | b | a | a |
| Durability running (relative value) | | 1.13 | 1.28 | 1.05 |
| Determination | | b | a | c |
| Comprehensive determination | | B | A | C |

TABLE 11

| | | Example | | | | | |
|---|---|---|---|---|---|---|---|
| | | 25 | 3 | 26 | 27 | 28 | 29 |
| Structure of tooth portion | | Two layer | | | | | |
| Proportion of area occupied by first rubber layer with respect to all rubber layers constituting tooth portion | | 40% | | | | | |
| Rubber composition | First rubber layer | R10 | R10 | R10 | R10 | R8 | R13 |
| | Second rubber layer | R1 | R2 | R4 | R5 | R1 | R1 |
| Tensile strength (MPa) [grain parallel direction] | First rubber layer | 76.1 | 76.1 | 76.1 | 76.1 | 60.3 | 63.6 |
| | Second rubber layer | 25.8 | 32.4 | 37.8 | 40.4 | 25.8 | 25.8 |
| | Ratio | 2.9 | 2.4 | 2.0 | 1.9 | 2.3 | 2.5 |
| Tensile elastic modulus (MPa) [grain perpendicular direction] | First rubber layer | 14.0 | 14.0 | 14.0 | 14.0 | 5.3 | 23.5 |
| | Second rubber layer | 2.4 | 3.8 | 9.4 | 10.9 | 2.4 | 2.4 |
| | Ratio | 5.8 | 3.7 | 1.5 | 1.3 | 2.2 | 9.8 |
| Hardness (type D) | First rubber layer | 71 | 71 | 71 | 71 | 68 | 78 |
| | Second rubber layer | 62 | 65 | 70 | 71 | 62 | 62 |

TABLE 11-continued

| | | | | | | | |
|---|---|---|---|---|---|---|---|
| Bending rigidity (MPa) | | 664 | 671 | 779 | 805 | 596 | 727 |
| Determination | | a | a | b | c | a | b |
| Tooth rigidity (N/mm) | | 1408 | 1442 | 1594 | 1623 | 1258 | 1667 |
| Determination | | a | a | a | a | b | a |
| Jumping torque (relative value) | | 1.09 | 1.11 | 1.14 | 1.14 | 1.02 | 1.16 |
| Determination | | a | a | a | a | a | a |
| Durability running (relative value) | | 1.88 | 2.08 | 1.14 | 1.08 | 1.23 | 1.24 |
| Determination | | a | a | b | c | b | b |
| Comprehensive determination | | A | A | B | C | B | B |

| | | Example | | | | Comparative Example | |
|---|---|---|---|---|---|---|---|
| | | 30 | 31 | 32 | 33 | 9 | 10 |
| Structure of tooth portion | | Two layer | | | | | |
| Proportion of area occupied by first rubber layer with respect to all rubber layers constituting tooth portion | | 40% | | | | | |
| Rubber composition | First rubber layer | R13 | R27 | R10 | R17 | R10 | R8 |
| | Second rubber layer | R7 | R26 | R2 | R2 | R7 | R7 |
| Tensile strength (MPa) [grain parallel direction] | First rubber layer | 63.6 | 75.6 | 76.1 | 61.3 | 76.1 | 60.3 |
| | Second rubber layer | 43.5 | 32.0 | 32.4 | 32.4 | 43.5 | 43.5 |
| | Ratio | 1.5 | 2.4 | 2.4 | 1.9 | 1.7 | 1.4 |
| Tensile elastic modulus (MPa) [grain perpendicular direction] | First rubber layer | 23.5 | 13.9 | 14.0 | 14.0 | 14.0 | 5.3 |
| | Second rubber layer | 16.8 | 3.8 | 3.8 | 3.8 | 16.8 | 16.8 |
| | Ratio | 1.4 | 3.7 | 3.7 | 3.7 | 0.8 | 0.3 |
| Hardness (type D) | First rubber layer | 78 | 71 | 71 | 75 | 71 | 68 |
| | Second rubber layer | 75 | 64 | 65 | 65 | 75 | 75 |
| Bending rigidity (MPa) | | 858 | 669 | 679 | 717 | 842 | 832 |
| Determination | | c | a | a | b | c | c |
| Tooth rigidity (N/mm) | | 2074 | 1434 | 1468 | 1452 | 1764 | 1566 |
| Determination | | a | a | a | a | a | a |
| Jumping torque (relative value) | | 1.59 | 1.10 | 1.15 | 1.10 | 1.37 | 1.19 |
| Determination | | a | a | a | a | a | a |
| Durability running (relative value) | | 1.01 | 2.07 | 2.03 | 1.29 | 0.42 | 0.74 |
| Determination | | c | a | a | a | d | d |
| Comprehensive determination | | C | A | A | A | D | D |

Comparative Examples 1 to 5

Comparative Example 1 is an example of a toothed belt in which a tooth portion has a two-layer structure of a first rubber layer (surface rubber layer) disposed on a front surface side along a contour of the tooth portion and a second rubber layer (internal rubber layer) disposed inside the tooth portion, the first rubber layer is made of R3 (crosslinked rubber) having a tensile elastic modulus of 6.0 MPa, and the second rubber layer is made of R2 (crosslinked rubber) having a tensile elastic modulus of 3.8 MPa. A ratio of the tensile elastic modulus of the first rubber layer to the tensile elastic modulus of the second rubber layer is 1.6. Hereinafter, this ratio (tensile elastic modulus of the first rubber layer/tensile elastic modulus of the second rubber layer) is referred to as a "ratio of the tensile elastic moduli of the two layers".

Comparative Examples 2 to 5 are examples in which a tensile elastic modulus was increased by increasing an amount of a first co-crosslinking agent in the first rubber layer of Comparative Example 1, and as the amount increased, the tensile elastic modulus was increased to 9.4 MPa in Comparative Example 2, 10.9 MPa in Comparative Example 3, 13.7 MPa in Comparative Example 4, and 16.8 MPa in Comparative Example 5.

As a result, a bending rigidity was 602 N/mm (Comparative Example 1: determined as "a"), 652 N/mm (Comparative Example 2: determined as "a"), 660 N/mm (Comparative Example 3: determined as "a"), 676 N/mm (Comparative Example 4: determined as "a"), and 724 N/mm (Comparative Example 5: determined as "b"), all of which were at an acceptable level.

A tooth rigidity was 1,185 MPa (Comparative Example 1: determined as "b"), 1,362 MPa (Comparative Example 2: determined as "a"), 1,410 MPa (Comparative Example 3: determined as "a"), 1,454 MPa (Comparative Example 4: determined as "a"), and 1,527 MPa (Comparative Example 5: determined as "a"), all of which were at an acceptable level.

Regarding dynamic performance, a jumping torque (relative value) was 0.95 (Comparative Example 1: determined as "c"), 1.00 (Comparative Example 2: determined as "b"), 1.03 (Comparative Example 3: determined as "a"), 1.06 (Comparative Example 4: determined as "a"), and 1.07 (Comparative Example 5: determined as "a"), all of which were at an acceptable level, and increased as the tensile elastic modulus of the first rubber layer increased in the same tendency as the tooth rigidity.

However, durability running (running time until failure (relative value)) was 0.53 (Comparative Example 1: determined as "d"), 1.00 (Comparative Example 2: determined as "d"), 0.80 (Comparative Example 3: determined as "d"), 0.86 (Comparative Example 4: determined as "d"), and 0.69 (Comparative Example 5: determined as "d"), and the comprehensive determination was unacceptable (rank D). In these examples, it can be estimated that due to long-term running, a minute crack that occurs was grown and the tooth chipping occurred.

Examples 1 to 6

Example 1 is an example in which in the first rubber layer of Comparative Example 1, a content of a co-crosslinking agent was as small as 1 part by mass (the same amount as the second rubber layer), but an amount of first short fibers was increased to 20 parts by mass. That is, a first rubber laver is made of R8 (crosslinked rubber) having a tensile elastic modulus of 5.3 MPa, a second rubber laver is made of R2 (crosslinked rubber) having a tensile elastic modulus of 3.8 MPa, and a ratio of the tensile elastic moduli of the two layers is 1.4.

Regarding dynamic performance, a jumping torque (relative value) was at the same level as that of Comparative Example 1 in which the jumping torque was 0.95 (determined as "c"), but durability running (running time until failure (relative value)) was increased to 1.43 (determined as "a") as compared with Comparative Example 1 in which the durability running was 0.53 (determined as "c"), and thus the comprehensive determination was acceptable (rank C).

Example 2 is an example in which in the first rubber layer of Comparative Example 1, an amount of first short fibers was increased to 20 parts by mass while keeping a content of a co-crosslinking agent the same (3 parts by mass). That is, a first rubber layer is made of R9 (crosslinked rubber) having a tensile elastic modulus of 9.0 MPa, a second rubber layer is made of R2 (crosslinked rubber) having a tensile elastic modulus of 3.8 MPa, and a ratio of the tensile elastic moduli of the two layers is 2.4.

Example 3 is an example in which, in the first rubber layer of Comparative Example 2, an amount of first short fibers was increased to 20 parts by mass while keeping a content of a co-crosslinking agent the same (6 parts by mass). That is, a first rubber layer is made of R10 (crosslinked rubber) having a tensile elastic modulus of 14 MPa, a second rubber layer is made of R2 (crosslinked rubber) having a tensile elastic modulus of 3.8 MPa. and a ratio of the tensile elastic moduli of the two layers is 3.7.

Example 4 is an example in which, in the first rubber layer of Comparative Example 3, an amount of first short fibers was increased to 20 parts by mass while keeping a content of a co-crosslinking agent the same (8 parts by mass). That is, a first rubber layer is made of R10 (crosslinked rubber) having a tensile elastic modulus of 14.3 MPa, a second rubber layer is made of R2 (crosslinked rubber) having a tensile elastic modulus of 3.8 MPa, and a ratio of the tensile elastic moduli of the two layers is 3.8.

Example 5 is an example in which, in the first rubber layer of Comparative Example 4, an amount of first short fibers was increased to 20 parts by mass while keeping a content of a co-crosslinking agent the same (11 parts by mass). That is, a first rubber layer is made of R12 (crosslinked rubber) having a tensile elastic modulus of 19.2 MPa, a second rubber layer is made of R2 (crosslinked rubber) having a tensile elastic modulus of 3.8 MPa, and a ratio of the tensile elastic moduli of the two layers is 5.1.

Example 6 is an example in which, in the first rubber layer of Comparative Example 5, an amount of first short fibers was increased to 20 parts by mass while keeping a content of a first co-crosslinking agent the same (14 parts by mass). That is, a first rubber layer is made of R13 (crosslinked rubber) having a tensile elastic modulus of 23.5 MPa, a second rubber layer is made of R2 (crosslinked rubber) having a tensile elastic modulus of 3.8 MPa, and a ratio of the tensile elastic moduli of the two layers is 6.2.

Regarding Examples 2 to 6, when comparing with the corresponding Comparative Examples (comparison in which the content of the first co-crosslinking agent was the same and the amount of the first short fibers was increased), in any comparison, a jumping torque (relative value) was equal to or more than those of Comparative Examples and determined as "a", and durability running (running time until failure (relative value)) was also increased to 1.64 (Example 2: determined as "a"), 2.08 (Example 3: determined as "a"), 1.50 (Example 4: determined as "a"), 1.55 (Example 5: determined as "a"), and 1.54 (Example 6: determined as "a") as compared with Comparative Examples, which were at an unacceptable level, and thus the comprehensive determination was acceptable (rank A).

In particular, Example 3 (R10, 6 parts by mass of the first co-crosslinking agent) exhibited excellent results in both the jumping torque and the durability running, and it was found that a running life was not extended even when an amount of the first co-crosslinking agent was further increased. From the above results, it was confirmed that the increase in the amount of the first short fibers was effective in improving durability (obtaining long life).

Comparative Examples 6 to 8

Comparative Example 6 is an example of a toothed belt in which the entire rubber layer forming a tooth portion was made only of R2 (crosslinked rubber) having a tensile elastic modulus of 3.8 MPa (relatively small elastic modulus), which was for forming the second rubber layer of Examples 1 to 6. A bending rigidity was 553 MPa (determined as "a"), which was better than those of Examples, but a tooth rigidity was 1,092 N/mm (determined as "c"), which was unacceptable. Regarding dynamic performance, a jumping torque (relative value) was 0.90 (determined as "d"), durability running (running time until failure (relative value)) was 0.33 (determined as "d"), and the comprehensive determination was unacceptable (rank D).

Comparative Example 7 is an example of a toothed belt in which the entire rubber layer forming a tooth portion was made only of R10 (crosslinked rubber) having a tensile elastic modulus of 14 MPa (relatively large elastic modulus), which was for forming the first rubber layer of Example 3. A tooth rigidity was 1,750 N/mm (determined as "a"), which was better than those of Examples, but a bending rigidity was 825 MPa (determined as "c"), which was unacceptable. Regarding dynamic performance, a jumping torque (relative value) was 1.35 (determined as "a"), but durability running (running time until failure (relative value)) was 0.43 (determined as "d"), and thus the comprehensive determination was unacceptable (rank D).

Comparative Example 8 is an example in which a tooth portion has a two-layer structure of a first rubber layer and a second rubber layer as in Examples, but elastic moduli of the first rubber layer and the second rubber layer are reversed. That is, R2 (crosslinked rubber) having a tensile elastic modulus of 3.8 MPa (relatively small elastic modulus) was used for the first rubber layer, and R10 (crosslinked rubber) having a tensile elastic modulus of 14 MPa (relatively large elastic modulus) was used for the second rubber layer. In a cross-sectional view of the tooth portion, a proportion of an area occupied by the first rubber layer with respect to all the rubber lavers constituting the tooth portion was 50%. As a result, a tooth rigidity was 1,275 N/mm (determined as "b"), which was at an acceptable level, but a bending rigidity was 820 MPa (determined as "c"), which was unacceptable. Regarding dynamic performance, a jumping torque (relative value) was 1.07 (determined as "a"), but durability running (running time until failure (relative value)) was 0.75 (determined as "d"), and thus the comprehensive determination was unacceptable (rank D).

When the entire tooth portion is formed by a rubber layer having a small elastic modulus as in Comparative Example 6, a rigidity (deformation resistance) of the tooth portion is insufficient, and when the entire tooth portion is formed by a rubber layer having a large elastic modulus as in Comparative Example 7, bendability (low bending rigidity) is insufficient. Further, as in Comparative Example 8, even if the tooth portion is formed by two layers, when an inside is formed by a rubber layer having a larger elastic modulus than a surface, bendability (low bending rigidity) is insufficient, and a level of a rigidity (deformation resistance) of the tooth portion is also reduced. Further, since a first rubber layer in which a predetermined amount of short fibers are oriented is not provided, durability is low.

On the other hand, an aspect of the present Examples is a balanced aspect which has a rigidity (high elastic modulus) of a tooth portion that can withstand use under a condition in which a higher load acts, and can achieve both the rigidity (deformation resistance) of the tooth portion and bendability (low bending rigidity: flexibility) which have a contradictory relationship, and is also excellent in durability.

Examples 7 to 10

With respect to the toothed belt of Example 3 in which the first rubber layer is made of R10 (crosslinked rubber) having a tensile elastic modulus of 14 MPa and the second rubber layer is made of R2 (crosslinked rubber) having a tensile elastic modulus of 3.8 MPa, Examples 7 to 10 are examples of toothed belts in which a proportion of an area occupied by a first rubber layer with respect to all rubber layers constituting a tooth portion is varied in a cross-sectional view of the tooth portion.

In Examples 7 to 10 and Example 3, in the cross-sectional view of the tooth portion, the proportion of the area occupied by the first rubber layer with respect to all the rubber layers constituting the tooth portion is 10% (Example 7), 20% (Example 8), 40% (Example 3), 60% (Example 9), and 80% (Example 10).

As a result, a tooth rigidity was 1,275 N/mm (Example 7: determined as "b"), 1,347 N/mm (Example 8: determined as "a"), 1,442 N/mm (Example 3: determined as "a"), 1,527 N/mm (Example 9: determined as "a"), and 1,561 N/mm (Example 10: determined as "a"), all of which were at an acceptable level, and increased as the proportion of the area of the first rubber layer was increased.

On the other hand, a bending rigidity was 601 MPa (Example 7: determined as "a"), 633 MPa (Example 8: determined as "a"), 671 MPa (Example 3: determined as "a"), 692 MPa (Example 9: determined as "a"), and 743 MPa (Example 10: determined as "b"), all of which were at an acceptable level, and increased as the proportion of the area of the first rubber layer was increased.

Regarding dynamic performance, a jumping torque (relative value) was 1.00 (Example 7: determined as "b"), 1.10 (Example 8: determined as "a"), 1.11 (Example 3: determined as "a"), 1.26 (Example 9: determined as "a"), and 1.31 (Example 10: determined as "a"), all of which were at an acceptable level, and increased as the proportion of the area of the first rubber layer was increased in the same tendency as the tooth rigidity.

Further, durability running (running time until failure (relative value)) was 1.41 (Example 7: determined as "a"), 1.82 (Example 8: determined as "a"), 2.08 (Example 3: determined as "a"), 1.69 (Example 9: determined as "a"), and 1.07 (Example 10: determined as "c"), all of which were at an acceptable level, and the proportion of the area of the first rubber layer was particularly increased in a range of 20% to 60%.

In the above comprehensive determination, the toothed belts of Examples 7 to 10 were at an acceptable level (rank A to rank C).

Examples 11 to 15

With respect to a configuration of Example 3 (20 parts by mass of the first short fibers, 6 parts by mass of the first co-crosslinking agent, and 40% of proportion of the area occupied by the first rubber layer with respect to all the rubber layers constituting the tooth portion in the cross-sectional view of the tooth portion) having the best durability running property among Examples 1 to 6, Examples 11 to 15 are examples of toothed belts using a rubber composition in which first short fibers contained in a first rubber layer are varied. A first rubber layer was formed using R14 (5 parts by mass of short fibers, tensile elastic modulus of 10.8 MPa) in Example 11, R15 (10 parts by mass of short fibers, tensile elastic modulus of 12.6 MPa) in Example 12, R10 (20 parts by mass of short fibers, tensile elastic modulus of 14 MPa) in Example 3, R16 (30 parts by mass of short fibers, tensile elastic modulus of 13.7 MPa) in Example 13, R17 (50 parts by mass of short fibers, tensile elastic modulus of 14.0 MPa) in Example 14, and R18 (60 parts by mass of short fibers, tensile elastic modulus of 13.9 MPa) in Example 15. A rubber composition of R19 (65 parts by mass of short fibers) was not able to be kneaded, and thus a toothed belt could not be produced.

As a result, a tooth rigidity was 1,271 N/mm (Example 11: determined as "b"), 1,367 N/mm (Example 12: determined as "a"), 1,442 N/mm (Example 3: determined as "a"), 1,430 N/mm (Example 13: determined as "a"), 1,432 N/mm (Example 14: determined as "a"), and 1,425 N/mm (Example 15: determined as "a"), all of which were at an acceptable level.

On the other hand, a bending rigidity was 648 MPa (Example 11: determined as "a"), 662 MPa (Example 12: determined as "a"), 671 MPa (Example 3: determined as "a"), 687 MPa (Example 13: determined as "a"), 706 MPa (Example 14: determined as "b"), and 713 MPa (Example 15: determined as "b"), and increased as the elastic modulus of the first rubber layer was increased.

Regarding dynamic performance, a jumping torque (relative value) was 1.03 (Example 11: determined as "a"), 1.05 (Example 12: determined as "a"), 1.11 (Example 3: determined as "a"), 1.07 (Example 13: determined as "a"), 1.07 (Example 14: determined as "a"), and 1.06 (Example 15: determined as "a"), all of which were at an acceptable level, and had the same tendency as the tooth rigidity.

On the other hand, durability running (running time until failure (relative value)) was 1.24 (Example 11: determined as "b"), 1.86 (Example 12: determined as "a"), 2.08 (Example 3: determined as "a"), 1.30 (Example 13: determined as "a"), 1.25 (Example 14: determined as "a"), and 1.21 (Example 15: determined as "b"), all of which were at an acceptable level.

In the above comprehensive determination, the toothed belts of Examples 3 and 11 to 15 were at a high acceptable level (rank A or rank B) in that a reinforcing effect was exhibited in terms of both the jumping torque and the durability running property. In particular, in Example 12 (10 parts by mass of short fibers, tensile elastic modulus of 12.6 MPa) and Example 3 (20 parts by mass of short fibers, tensile elastic modulus of 14.0 MPa), the jumping torque is excellent, and an effect of the durability running property (long life) is significantly exhibited. In particular, in Example 3, it can be said that a tensile strength of the rubber composition (R10) is remarkably large and the reinforcing effect is high. On the other hand, in Examples 13 to 15 in which an amount of the first short fibers was further increased, an effect of achieving a long life as much as in Example 12 or Example 3 was not exhibited, and thus regarding the reinforcing effect by the first short fibers, it can be said that a content of about 10 parts by mass to 30 parts by mass with a peak of about 20 parts by mass is a particularly suitable range.

From the above results, it can be said that a suitable range for a physical property value of the first rubber layer is 4 MPa to 25 MPa (particularly 10 MPa to 15 MPa) in a belt width (opposite grain) direction in terms of the tensile elastic modulus. It can be said that a suitable range for a proportion of the short fibers contained in the first rubber layer is 5 parts by mass to 60 parts by mass (particularly 10 parts by mass to 30 parts by mass).

Example 16

With respect to a configuration of Example 1 (R8: 20 parts by mass of the first short fibers, 1 part by mass of the first co-crosslinking agent), Example 16 is an example of a toothed belt in which an amount of first short fibers contained in a first rubber layer is reduced to 10 parts by mass. Example 16 is an example in which contents of the first short fibers and a first co-crosslinking agent that affect an elastic modulus (reinforcement) of the first rubber layer were verified at a level near a lower limit of a reinforcing effect. That is, the first rubber layer is made of R20 (crosslinked rubber) having a tensile elastic modulus of 4.3 MPa, a second rubber layer is made of R2 (crosslinked rubber) having a tensile elastic modulus of 3.8 MPa, and a ratio of the tensile elastic moduli of the two layers is 1.1. Regarding dynamic performance, a jumping torque (relative value) was at the same level as that of Comparative Example 1 in which the jumping torque was 0.95 (determined as "c"), but durability running (running time until failure (relative value)) reached an acceptable level of 1.24 (determined as "b"), and thus the comprehensive determination was acceptable (rank C), and the reinforcing effect was confirmed.

Examples 17 and 18

With respect to the configuration of Example 1 (R8: 20 parts by mass of the first short fibers, 1 part by mass of the first co-crosslinking agent), Example 17 is an example of a toothed belt in which an amount of first short fibers contained in a first rubber layer is increased to 50 parts by mass. That is, the first rubber layer is made of R21 (crosslinked rubber) having a tensile elastic modulus of 9.5 MPa, a second rubber layer is made of R2 (crosslinked rubber) having a tensile elastic modulus of 3.8 MPa, and a ratio of the tensile elastic moduli of the two layers is 2.5. Regarding dynamic performance, a jumping torque (relative value) was 1.00 (determined as "b"), and durability running (running time until failure (relative value)) reached an acceptable level of 1.30 (determined as "a"), and thus the comprehensive determination was acceptable (rank B).

Example 18 is an example of a toothed belt in which a type of the first short fibers of Example 17 was changed to a meta-aramid fiber. That is, a first rubber layer is made of R22 (crosslinked rubber) having a tensile elastic modulus of 10 MPa, a second rubber layer is made of R2 (crosslinked rubber) having a tensile elastic modulus of 3.8 MPa. and a ratio of the tensile elastic moduli of the two layers is 2.6. Regarding dynamic performance, a jumping torque (relative value) was 1.00 (determined as "b"), and durability running (running time until failure (relative value)) reached an acceptable level of 1.51 (determined as "a"), and thus the comprehensive determination was acceptable (rank B). It can be said that even if the type of the short fibers is changed, there is no significant difference in a reinforcing effect.

Examples 19 to 21

With respect to the configuration of Example 3 (R10: 20 parts by mass of nylon short fibers, 6 parts by mass of the first co-crosslinking agent) having the best durability running property, Example 19 is an example of a toothed belt in which a type of first short fibers is changed to a meta-aramid fiber. That is, a first rubber layer is made of R23 (crosslinked rubber) having a tensile elastic modulus of 14 MPa, a second rubber layer is made of R2 (crosslinked rubber) having a tensile elastic modulus of 3.8 MPa, and a ratio of the tensile elastic moduli of the two layers is 3.7. Regarding dynamic performance, a jumping torque (relative value) was 1.12 (determined as "a"), and durability running (running time until failure (relative value)) reached an acceptable level of 2.11 (determined as "a"), and the comprehensive determination was acceptable (rank A) at the same level as in Example 3.

Example 20 is an example of a toothed belt in which a type of first short fibers was changed to a para-aramid fiber. That is, a first rubber layer is made of R24 (crosslinked rubber) having a tensile elastic modulus of 14.8 MPa, a second rubber layer is made of R2 (crosslinked rubber) having a tensile elastic modulus of 3.8 MPa, and a ratio of the tensile elastic moduli of the two layers is 3.9. Regarding dynamic performance, a jumping torque (relative value) was 1.15 (determined as "a"), and durability running (running time until failure (relative value)) reached an acceptable level of 1.39 (determined as "a"), and thus the comprehensive determination was acceptable (rank A).

Example 21 is an example of a toothed belt in which a type of first short fibers was changed to a PBO fiber. That is, a first rubber layer is made of R25 (crosslinked rubber) having a tensile elastic modulus of 13 MPa, a second rubber layer is made of R2 (crosslinked rubber) having a tensile elastic modulus of 3.8 MPa, and a ratio of the tensile elastic moduli of the two layers is 3.4. Regarding dynamic performance, a jumping torque (relative value) was 1.12 (determined as "a"), and durability running (running time until failure (relative value)) reached an acceptable level of 1.85 (determined as "a"), and thus the comprehensive determination was acceptable (rank A).

It was confirmed that even if the type of the short fibers was changed, a reinforcing effect was obtained on both the jumping torque and the durability running property (long life).

Examples 22 to 24

Examples 22 to 24 are examples in which a relationship was verified between a proportion of an area occupied by a first rubber layer with respect to all rubber layers constituting a tooth portion in a cross-sectional view of the tooth portion (hereinafter, referred to as an area proportion) and an elastic modulus of the first rubber layer (proportion of first short fibers contained in the first rubber layer). Example 22 is an example near a lower limit of a reinforcing effect (when an area proportion is small and a proportion of first short fibers is also small), in which an area proportion is 10%, and an amount of first short fibers is 5 parts by mass (tensile elastic modulus of 10.8 MPa). On the other hand, Examples 23 and 24 are examples near an upper limit of the reinforcing effect (w % ben an area proportion is large and a proportion of first short fibers is also large), in which an area proportion is 60% and an amount of first short fibers is 50 parts by mass (tensile elastic modulus of 14 MPa) in Example 23, and an area proportion is 80% and an amount of first short fibers is 50 parts by mass (tensile elastic modulus of 14 MPa) in Example 24.

Regarding dynamic performance, a jumping torque (relative value) was 1.00 (Example 22: determined as "b"), 1.28 (Example 23: determined as "a"), and 1.35 (Example 24: determined as "a"), all of which were at an acceptable level.

On the other hand, durability running (running time until failure (relative value)) was 1.13 (Example 22: determined as "b"), 1.28 (Example 23: determined as "a"), and 1.05 (Example 24: determined as "c"), all of which were at an acceptable level, and it can be said that there was a reinforcing effect.

In the above comprehensive determination, the toothed belts of Examples 22 to 24 were at an acceptable level (rank A to rank C).

Examples 25 to 27 and Comparative Example 9

With respect to the configuration of Example 3 having the best durability running property among Examples 1 to 6, Examples 25 to 27 and Comparative Example 9 are examples of toothed belts in which a rubber composition having a different tensile elastic modulus is used for a second rubber layer. That is, R2 (tensile elastic modulus of 3.8 MPa, ratio of the tensile elastic moduli of the two layers of 3.7) was used in Example 3, whereas a second rubber layer was made of R1 (tensile elastic modulus of 2.4 MPa, ratio of tensile elastic moduli of two layers of 5.8) in Example 25, R4 (tensile elastic modulus of 9.4 MPa, ratio of tensile elastic moduli of two layers of 1.5) in Example 26, R5 (tensile elastic modulus of 10.9 MPa, ratio of tensile elastic moduli of two layers of 1.3) in Example 27, and R7 (tensile elastic modulus of 16.8 MPa, ratio of tensile elastic moduli of two layers of 0.8) in Comparative Example 9.

Regarding dynamic performance, a jumping torque (relative value) was 1.09 (Example 25: determined as "a"), 1.14 (Example 26: determined as "a"), 1.14 (Example 27: determined as "a"), and 1.37 (Comparative Example 9: determined as "a"), all of which were at an acceptable level, and it can be said that there is a reinforcing effect.

durability running (running time until failure (relative value)) was 1.88 (Example 25: determined as "a"), 1.14 (Example 26: determined as "b"), 1.08 (Example 27: determined as "c"), and 0.42 (Comparative Example 9: determined as "d"), and Examples 25 to 27 were at an acceptable level, and it can be said that there was a reinforcing effect. On the other hand. Comparative Example 9 was unacceptable.

In the above comprehensive determination, the toothed belts of Examples 25 to 27 were at an acceptable level (ranks A to C) in that a reinforcing effect was exhibited in terms of both the jumping torque and the durability running property. In particular, in Example 25 (tensile elastic modulus of 2.4 MPa) and Example 26 (tensile elastic modulus of 9.4 MPa) in which the tensile elastic modulus of the second rubber layer was relatively small, the high acceptable level was achieved (rank A or rank B). In Example 27 (tensile elastic modulus of 10.9 MPa) in which the tensile elastic modulus of the second rubber layer was relatively large, an effect of achieving a long life was small and the rank was C. Further, in Comparative Example 9 in which the tensile elastic modulus of the second rubber layer was increased and became larger than a tensile elastic modulus of a first rubber layer, a running life was short and a result was unacceptable (rank D).

Examples 28 and 29

With respect to Example 25 (R1: tensile elastic modulus of 2.4 MPa) in which the tensile elastic modulus of the second rubber layer is relatively small, Examples 28 and 29 are examples of toothed belts in which a rubber composition of a first rubber layer to be combined is changed. Example 28 is a toothed belt in which a first rubber layer was made of R8 (crosslinked rubber) having a tensile elastic modulus of 5.3 MPa and a ratio of tensile elastic moduli of two layers was 2.2. A jumping torque (relative value) was 1.02 (determined as "a"), and durability running (running time until failure (relative value)) reached an acceptable level of 1.23 (determined as "b"), and thus the comprehensive determination was at an acceptable level (rank B).

Example 29 is a toothed belt in which a first rubber layer was made of R13 (crosslinked rubber) having a tensile elastic modulus of 23.5 MPa and a ratio of tensile elastic moduli of two layers was 9.8. A jumping torque (relative value) was 1.16 (determined as "a"), and durability running (running time until failure (relative value)) was 1.24 (determined as "b"), and thus the comprehensive determination was at an acceptable level (rank B).

Example 30 and Comparative Example 10

With respect to Comparative Example 9 (R7: tensile elastic modulus of 16.8 MPa, ratio of the tensile elastic moduli of the two layers of 0.8) in which the tensile elastic modulus of the second rubber layer is relatively large, Example 30 and Comparative Example 10 are examples of toothed belts in which a rubber composition of a first rubber layer to be combined is changed. Comparative Example 10 is a toothed belt in which a first rubber layer was made of R8 (crosslinked rubber) having a tensile elastic modulus of 5.3 MPa and a ratio of tensile elastic moduli of two layers was 0.3. A jumping torque (relative value) was 1.19 (determined as "a"), but durability running (running time until failure (relative value)) was 0.74 (determined as "d"), which was unacceptable. As in Comparative Example 9, Comparative Example 10 is an aspect in which a tensile elastic modulus of a second rubber layer was larger than a tensile elastic modulus of a first rubber layer, and the comprehensive determination was unacceptable (rank D).

On the other hand, Example 30 is a toothed belt in which a first rubber layer was made of R13 (crosslinked rubber) having a tensile elastic modulus of 23.5 MPa and a ratio of tensile elastic moduli of two layers was 1.4. A jumping torque (relative value) was 1.59 (determined as "a"), and durability running (running time until failure (relative value)) reached an acceptable level of 1.01 (determined as "c"), and thus the comprehensive determination was at an acceptable level (rank C).

Example 31

With respect to the configuration of Example 3 (the first rubber layer is made of R10, and the second rubber layer is made of R2) having the best durability running property among Examples 1 to 30, Example 31 is an example of a toothed belt in which a reinforcing inorganic filler (carbon black) is not used. That is, Example 31 is an example of a toothed belt in which a first rubber layer is made of a crosslinked rubber composition of R27 (tensile elastic modulus of 13.9 MPa) which is a composition obtained by removing carbon black from R10, and a second rubber layer is made of a crosslinked rubber composition of R26 (tensile elastic modulus of 3.8 MPa) which is a composition obtained by removing carbon black from R2. A jumping torque (relative value) was 1.10 (determined as "a"), and durability running (running time until failure (relative value)) was 2.07 (determined as "a"), and thus the comprehensive determination was at the same acceptable level (rank A) as in Example 3.

Examples 32 and 33

With respect to Example 3 (20 parts by mass of the first short fibers) and Example 14 (50 parts by mass of the first short fibers), respectively, Examples 32 and 33 are examples of toothed belts in which a tooth fabric is not provided on surfaces of a tooth portion and a tooth bottom portion of the belt. In Example 32, a jumping torque (relative value) was 1.15 (determined as "a"), and durability running (running time until failure (relative value)) was 2.03 (determined as "a"), and thus the comprehensive determination was at the same acceptable level (rank A) as in Example 3. In Example 33, a jumping torque (relative value) was 1.10 (determined as "a"), and durability running (running time until failure (relative value)) was 1.29 (determined as "a"), and thus the comprehensive determination was at the same acceptable level (rank A) as in Example 14.

From the above results, it was confirmed that by forming a first rubber layer formed along a tooth fabric and a second rubber layer formed between the first rubber layer and a tension member, adjusting an elastic modulus of the first rubber layer to be larger than an elastic modulus of the second rubber layer, and compounding short fibers in the first rubber layer in a manner of being oriented in a belt longitudinal direction along a contour of a tooth portion, both a rigidity of the tooth portion and bendability which have a contradictory relationship are achieved, jumping (tooth skipping) during belt running is prevented, and chipping of the tooth portion (tooth chipping) is prevented, making it possible to achieve a long life during high load running.

INDUSTRIAL APPLICABILITY

The toothed belt (synchronous power-transmission belt or toothed power-transmission belt) of the present invention can be used in combination with a toothed pulley in various fields in which synchronization between input and output is required, for example, power-transmission systems in vehicles such as automobiles and motorcycles, power-transmission systems such as motors and pumps of industrial machines, machines such as automatic doors and automated machines, copier, and printer. In particular, the toothed belt can be used as a power-transmission belt (timing belt or cogged belt) for industrial machines and rear-wheel drive of motorcycles in high load (high horsepower) applications.

Although the present invention has been described in detail with reference to specific embodiments, it is apparent to those skilled in the art that various modifications and changes can be made without departing from the spirit and scope of the present invention.

The present application is based on Japanese Patent Application No. 2021-159743 filed on Sep. 29, 2021, Japanese Patent Application No. 2022-086291 filed on May 26, 2022, and Japanese Patent Application No. 2022-143790 filed on Sep. 9, 2022, and the content thereof is incorporated herein by reference.

REFERENCE SIGNS LIST

1: toothed belt
1a: tooth portion
1b: tooth bottom portion
1c: back portion
2: tooth fabric
3: first rubber layer
3a: first short fiber
4: second rubber layer
5: tension member
6: back rubber layer

The invention claimed is:
1. A toothed belt, comprising:
a back portion in which a tension member extending along a belt circumferential direction is embedded;
a plurality of tooth portions formed on an inner circumferential surface of the back portion at intervals in the belt circumferential direction;
a back rubber layer formed on a belt outer circumferential side with respect to the tension member; and
a first rubber layer and a second rubber layer that are formed on a belt inner circumferential side with respect to the tension member, wherein
the back portion includes the back rubber layer,
an elastic modulus of the first rubber layer is larger than an elastic modulus of the second rubber layer,
the first rubber layer comprises a first crosslinked rubber composition comprising a first rubber component and a first short fiber,
a proportion of the first short fiber is 5 parts by mass to 60 parts by mass with respect to 100 parts by mass of the first rubber component,
the first short fiber is oriented in a belt longitudinal direction along a contour of the tooth portion, and
the tooth portion includes the first rubber layer and the second rubber layer that is interposed between the first rubber layer and the tension member.
2. The toothed belt according to claim 1, wherein
an area proportion of the first rubber layer is 10 area % to 80 area % with respect to a total area of the first rubber layer and the second rubber layer in a cross-sectional view in the belt circumferential direction.
3. The toothed belt according to claim 1, wherein
a tensile strength of the first rubber layer in the belt circumferential direction is 40 MPa to 90 MPa,
a tensile elastic modulus of the first rubber layer in a belt width direction is 4 MPa to 25 MPa,
a tensile strength of the second rubber layer in the belt circumferential direction is 10 MPa to 50 MPa, and
a tensile elastic modulus of the second rubber layer in the belt width direction is 1 MPa to 10 MPa.
4. The toothed belt according to claim 1, wherein
the tensile elastic modulus of the first rubber layer in the belt width direction is 1.1 times to 10 times the tensile elastic modulus of the second rubber layer in the belt width direction.
5. The toothed belt according to claim 1, wherein the first short fiber is a polyamide fiber.

6. The toothed belt according to claim 1, wherein
the first crosslinked rubber composition further comprises a first crosslinking agent and a first co-crosslinking agent,
the second rubber layer comprises a second crosslinked rubber composition comprising a second rubber component, a second crosslinking agent, and a second co-crosslinking agent,
the first rubber component comprises a first composite polymer comprising a hydrogenated nitrile rubber and an unsaturated carboxylic acid metal salt,
the second rubber component comprises a second composite polymer comprising a hydrogenated nitrile rubber and an unsaturated carboxylic acid metal salt,
a proportion of the first co-crosslinking agent is 1 part by mass to 40 parts by mass with respect to 100 parts by mass of the first rubber component, and
a proportion of the second co-crosslinking agent is 0.2 parts by mass to 25 parts by mass with respect to 100 parts by mass of the second rubber component.

7. The toothed belt according to claim 6, wherein
the second crosslinked rubber composition further comprises a second short fiber, and a proportion of the second short fiber in the second crosslinked rubber composition is 5 parts by mass or less with respect to 100 parts by mass of the second rubber component.

8. The toothed belt according to claim 6, wherein
the first crosslinked rubber composition further comprises a first reinforcing inorganic filler,
the second crosslinked rubber composition further comprises a second reinforcing inorganic filler,
a proportion of the first composite polymer in the first rubber component is 80 mass % or more,
a proportion of the second composite polymer in the second rubber component is 30 mass % or more,
the first crosslinking agent comprises a first organic peroxide, and a proportion of the first organic peroxide is 1 part by mass to 20 parts by mass with respect to 100 parts by mass of the first rubber component,
the second crosslinking agent comprises a second organic peroxide, and a proportion of the second organic peroxide is 0.5 parts by mass to 5 parts by mass with respect to 100 parts by mass of the second rubber component,
a proportion of the first reinforcing inorganic filler is 10 parts by mass or less with respect to 100 parts by mass of the first rubber component, and
a proportion of the second reinforcing inorganic filler is 10 parts by mass or less with respect to 100 parts by mass of the second rubber component.

9. A manufacturing method for the toothed belt according to claim 1, the method comprising:
a first rubber layer precursor preparation step of preparing an uncrosslinked rubber sheet in which a first short fiber is oriented in one direction of a sheet surface as a first rubber layer precursor for forming a first rubber layer; and
a preforming step of laminating the first rubber layer precursor and a second rubber layer precursor, which is an uncrosslinked rubber sheet for forming a second rubber layer, in an arrangement in which the first short fiber is oriented in a belt longitudinal direction to prepare a pre-formed body in a semi-crosslinked state.

* * * * *